US011230053B2

(12) United States Patent
Bartow et al.

(10) Patent No.: US 11,230,053 B2
(45) Date of Patent: *Jan. 25, 2022

(54) ADDITIVE PROCESSING OF FLUOROPOLYMERS

(71) Applicant: 3M INNOVATIVE PROPERTIES COMPANY, St. Paul, MN (US)

(72) Inventors: Jeffrey N. Bartow, West Saint Paul, MN (US); Carsten Franke, Saint Paul, MN (US); Robin E. Wright, Hudson, WI (US); Fee Zentis, Waging am see (DE); Klaus Hintzer, Kastl (DE); Gabriele H. Gottschalk-Gaudig, Mehring (DE); Bernd Gangnus, Isny (DE); Malte Korten, Moorenweis (DE); Gallus Schechner, Herrsching (DE); Wolfgang Neumann, Eichenring (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 474 days.

This patent is subject to a terminal disclaimer.

(21) Appl. No.: 16/071,819

(22) PCT Filed: Jan. 19, 2017

(86) PCT No.: PCT/US2017/014156
§ 371 (c)(1),
(2) Date: Jul. 20, 2018

(87) PCT Pub. No.: WO2017/127561
PCT Pub. Date: Jul. 27, 2017

(65) Prior Publication Data
US 2019/0022928 A1 Jan. 24, 2019

Related U.S. Application Data

(60) Provisional application No. 62/408,504, filed on Oct. 14, 2016, provisional application No. 62/385,439, (Continued)

(51) Int. Cl.
*B29C 64/106* (2017.01)
*B29C 64/124* (2017.01)
(Continued)

(52) U.S. Cl.
CPC .......... *B29C 64/165* (2017.08); *B29C 64/106* (2017.08); *B29C 64/30* (2017.08);
(Continued)

(58) Field of Classification Search
CPC ..... B29C 64/165; B29C 64/106; B29C 64/30; B29C 64/124; B29C 64/264; B33Y 10/00;
(Continued)

(56) References Cited

U.S. PATENT DOCUMENTS 2,434,058 A 1/1948 Stenzel
2,965,595 A 12/1960 Brinker
(Continued)

FOREIGN PATENT DOCUMENTS

CN 101080448 A 11/2007
CN 102205524 A 10/2011
(Continued)

OTHER PUBLICATIONS

Drummer, "Development of a Characterization Approach for the Sintering Behavior of New Thermoplastics for Selective Laser Sintering", Physics Procedia, 2010, vol. 5, pp. 533-542.
(Continued)

*Primary Examiner* — Joseph S Del Sole
*Assistant Examiner* — Baileigh Kate Darnell
(74) *Attorney, Agent, or Firm* — Thomas M. Spielbauer

(57) ABSTRACT

Provided are methods for making shaped fluoropolymer by additive processing using a polymerizable binder. Also are
(Continued)

3D printable compositions for making shaped fluoropolymer articles and articles comprising a shaped fluoropolymer.

13 Claims, 3 Drawing Sheets

Related U.S. Application Data filed on Sep. 9, 2016, provisional application No. 62/281,349, filed on Jan. 21, 2016.

(51) Int. Cl.

| | |
|---|---|
| *B33Y 10/00* | (2015.01) |
| *B33Y 70/00* | (2020.01) |
| *C08F 214/26* | (2006.01) |
| *C08L 27/18* | (2006.01) |
| *B29C 64/165* | (2017.01) |
| *B33Y 80/00* | (2015.01) |
| *C08L 23/12* | (2006.01) |
| *C08F 259/08* | (2006.01) |
| *B33Y 30/00* | (2015.01) |
| *B33Y 40/00* | (2020.01) |
| *B29C 64/30* | (2017.01) |
| *C09D 11/101* | (2014.01) |
| *C09D 11/106* | (2014.01) |
| *B29K 27/18* | (2006.01) |
| *B29K 27/00* | (2006.01) |
| *B33Y 40/20* | (2020.01) |
| *B29K 105/00* | (2006.01) |
| *B29K 27/12* | (2006.01) |

(52) U.S. Cl.
CPC ............... *B33Y 10/00* (2014.12); *B33Y 30/00* (2014.12); *B33Y 40/00* (2014.12); *B33Y 70/00* (2014.12); *B33Y 80/00* (2014.12); *C08F 214/26* (2013.01); *C08F 259/08* (2013.01); *C08L 23/12* (2013.01); *C08L 27/18* (2013.01); *C09D 11/101* (2013.01); *C09D 11/106* (2013.01); *B29C 64/124* (2017.08); *B29K 2027/12* (2013.01); *B29K 2027/14* (2013.01); *B29K 2027/16* (2013.01); *B29K 2027/18* (2013.01); *B29K 2105/0094* (2013.01); *B33Y 40/20* (2020.01); *C08L 2205/05* (2013.01)

(58) Field of Classification Search
CPC ......... B33Y 30/00; B33Y 40/00; B33Y 40/20; B33Y 70/00; B33Y 80/00; B29K 2105/0094; B29K 2027/12; C08F 214/26; C08F 2500/18; C08F 2500/12; C08F 220/10; C08F 230/08; C08L 27/18
See application file for complete search history.

(56) References Cited

U.S. PATENT DOCUMENTS

| | | |
|---|---|---|
| 2,968,649 A | 1/1961 | Pailthrop |
| 3,051,677 A | 8/1962 | Rexford |
| 3,318,854 A | 5/1967 | Honn et al. |
| 3,850,590 A | 11/1974 | Chaklley |
| 3,855,191 A | 12/1974 | Doughty, Jr. |
| 4,120,608 A | 10/1978 | Vassiliou |
| 4,281,092 A | 7/1981 | Breazeale |
| 4,349,650 A | 9/1982 | Krespan |
| 4,558,141 A | 12/1985 | Squire |
| 4,605,773 A | 8/1986 | Maloney |
| 4,612,351 A | 9/1986 | Caporiccio |
| 4,808,651 A | 2/1989 | Blickle |
| 5,077,870 A | 1/1992 | Melbye et al. |
| 5,178,644 A | 1/1993 | Huzinec |
| 5,229,480 A | 7/1993 | Uschold |
| 5,285,002 A | 2/1994 | Grootaert |
| 5,378,782 A | 1/1995 | Grootaert |
| 5,442,097 A | 8/1995 | Obermeier et al. |
| 5,554,680 A | 9/1996 | Ojakaar |
| 5,565,512 A | 10/1996 | Saito et al. |
| 5,621,145 A | 4/1997 | Saito et al. |
| 5,658,063 A | 8/1997 | Nasserbakht |
| 5,688,884 A | 11/1997 | Baker |
| 5,700,859 A | 12/1997 | Ogura |
| 5,700,879 A | 12/1997 | Yamamoto et al. |
| 5,763,552 A | 6/1998 | Feiring |
| 5,767,204 A | 6/1998 | Iwa et al. |
| 5,891,965 A | 4/1999 | Worm et al. |
| 5,895,799 A | 4/1999 | Wu |
| 5,905,545 A | 5/1999 | Poradish et al. |
| 6,025,307 A | 2/2000 | Chittofrati |
| 6,103,843 A | 8/2000 | Abusleme |
| 6,126,849 A | 10/2000 | Yamana |
| 6,132,660 A | 10/2000 | Kampfer |
| 6,255,535 B1 | 7/2001 | Schulz et al. |
| 6,255,536 B1 | 7/2001 | Worm et al. |
| 6,294,627 B1 | 9/2001 | Worm et al. |
| 6,429,258 B1 | 8/2002 | Morgan et al. |
| 6,472,452 B2 | 10/2002 | Ruepping |
| 6,495,213 B2 | 12/2002 | Ruepping |
| 6,506,460 B1 | 1/2003 | Paglia |
| 6,562,415 B2 | 5/2003 | Ruepping |
| 6,587,159 B1 | 7/2003 | Dewald |
| 6,599,586 B2 | 7/2003 | Ruepping |
| 6,602,557 B2 | 8/2003 | Ruepping |
| 6,613,941 B1 | 9/2003 | Felix et al. |
| 6,706,193 B1 | 3/2004 | Burkard et al. |
| 6,746,723 B2 | 6/2004 | Paglia |
| 6,794,550 B2 | 9/2004 | Hintzer et al. |
| 6,803,391 B2 | 10/2004 | Paglia |
| 7,018,541 B2 | 3/2006 | Hintzer et al. |
| 7,164,397 B2 | 1/2007 | Pettitt et al. |
| 7,360,905 B2 | 4/2008 | Davis et al. |
| 7,569,273 B2 | 8/2009 | Bredt |
| 8,097,673 B2 | 1/2012 | Jones |
| 8,354,170 B1 | 1/2013 | Henry |
| 8,705,133 B2 | 4/2014 | Lieb et al. |
| 8,820,944 B2 | 9/2014 | Vasquez |
| 8,969,500 B2 | 3/2015 | Hintzer et al. |
| 2003/0138580 A1* | 7/2003 | Blong ............... C08L 27/18 428/36.9 |
| 2003/0162923 A1* | 8/2003 | Funaki ............... C08F 214/18 526/250 |
| 2004/0091298 A1 | 5/2004 | Nellen |
| 2004/0171736 A1 | 9/2004 | Dadalas |
| 2005/0003189 A1* | 1/2005 | Bredt ............... B29C 64/165 428/402 |
| 2005/0006811 A1* | 1/2005 | Blong ............... C08L 27/18 264/176.1 |
| 2006/0251535 A1 | 11/2006 | Pfeifer et al. |
| 2006/0290032 A1* | 12/2006 | Sano ............... B29C 64/165 264/494 |
| 2007/0031791 A1 | 2/2007 | Cinader, Jr. et al. |
| 2007/0232753 A1 | 10/2007 | Monsheimer et al. |
| 2009/0233045 A1 | 9/2009 | Slama et al. |
| 2010/0283188 A1 | 11/2010 | Rohner et al. |
| 2011/0172338 A1 | 7/2011 | Murakami |
| 2012/0129982 A1* | 5/2012 | Zipplies ............... C08L 27/20 524/58 |
| 2012/0201960 A1 | 8/2012 | Hartmann |
| 2013/0040142 A1 | 2/2013 | Frey et al. |
| 2013/0081599 A1 | 4/2013 | Collet |
| 2013/0010981 A1 | 5/2013 | Xie et al. |
| 2014/0080066 A1 | 3/2014 | Meya et al. |
| 2014/0113105 A1 | 4/2014 | Yasukochi |
| 2015/0125334 A1 | 5/2015 | Uetani |
| 2015/0218296 A1 | 8/2015 | Kaspar et al. |
| 2016/0126631 A1 | 5/2016 | Yosui et al. |
| 2016/0185962 A1 | 6/2016 | Zhou et al. |
| 2016/0318250 A1 | 11/2016 | Moussa |
| 2016/0332370 A1 | 11/2016 | Arai et al. |
| 2017/0015848 A1 | 1/2017 | Aruga |
| 2017/0157842 A1 | 6/2017 | Sato et al. |

(56) References Cited

U.S. PATENT DOCUMENTS

| | | | |
|---|---|---|---|
| 2017/0283655 | A1 | 10/2017 | Kennet et al. |
| 2017/0342303 | A1 | 11/2017 | Stevenson et al. |
| 2018/0126631 | A1 | 5/2018 | Nauka et al. |
| 2018/0250877 | A1 | 9/2018 | Okamoto et al. |
| 2018/0298155 | A1* | 10/2018 | Hosoda .................. C08J 5/24 |
| 2019/0184632 | A1 | 6/2019 | Achten et al. |

FOREIGN PATENT DOCUMENTS

| | | | |
|---|---|---|---|
| CN | 202088120 U | 12/2011 | |
| CN | 103264361 A | 8/2013 | |
| CN | 103273432 A | 9/2013 | |
| CN | 103762093 A | 4/2014 | |
| CN | 104140668 A | 11/2014 | |
| CN | 104440597 A | 3/2015 | |
| CN | 104530668 A | 4/2015 | |
| CN | 103476570 B | 11/2015 | |
| CN | 105017734 A | 11/2015 | |
| CN | 105081992 A | 11/2015 | |
| CN | 103709737 | 3/2016 | |
| CN | 105711104 | 6/2016 | |
| CN | 108401513 A | 8/2018 | |
| CN | 108495876 | 9/2018 | |
| EP | 003063 | 7/1979 | |
| EP | 0 086 397 A2 | 8/1983 | |
| EP | 0 466 422 A1 | 1/1992 | |
| EP | H06-262693 A | 9/1994 | |
| EP | 0752432 | 8/1999 | |
| EP | 0712882 | 4/2000 | |
| EP | 2002-337167 A | 11/2002 | |
| EP | 0969027 | 10/2003 | |
| EP | 1 666 234 A1 | 6/2006 | |
| EP | 1148072 | 8/2009 | |
| EP | 1059342 | 7/2010 | |
| EP | 2 251 185 A1 | 11/2010 | |
| EP | 1529785 | 3/2011 | |
| EP | 1097948 | 6/2011 | |
| EP | 1533325 | 10/2011 | |
| EP | 2 592 116 A1 | 5/2013 | |
| EP | 2488347 | 3/2014 | |
| EP | 2 821 543 A1 | 1/2015 | |
| EP | 2 881 430 A1 | 6/2015 | |
| EP | 2 902 424 A1 | 8/2015 | |
| EP | 2902424 | 8/2015 | |
| JP | S61198678 A | 9/1986 | |
| JP | 2005-297325 A | 10/2005 | |
| JP | 2010-106102 A | 5/2010 | |
| WO | WO 98/09798 A1 | 3/1998 | |
| WO | WO 99/47615 A1 | 9/1999 | |
| WO | WO 2000-009603 | 2/2000 | |
| WO | WO 2000-022002 | 4/2000 | |
| WO | WO 2000-071590 | 11/2000 | |
| WO | WO 2001-046107 | 6/2001 | |
| WO | WO 01/78969 A2 | 10/2001 | |
| WO | WO 2002-045907 | 6/2002 | |
| WO | WO 2003-051988 | 6/2003 | |
| WO | WO 2003-059992 | 7/2003 | |
| WO | WO 2004-113042 | 12/2004 | |
| WO | WO 2006-065334 | 6/2006 | |
| WO | WO 2006-091519 | 8/2006 | |
| WO | WO 2007-133912 | 11/2007 | |
| WO | WO 2008-140914 | 11/2008 | |
| WO | WO 2010/151610 A2 | 12/2010 | |
| WO | WO 2011-014715 | 2/2011 | |
| WO | WO 2011-139807 | 11/2011 | |
| WO | WO 2012-012289 | 1/2012 | |
| WO | WO 2012-018603 | 2/2012 | |
| WO | WO 2012-166546 | 12/2012 | |
| WO | WO 2013-123156 | 8/2013 | |
| WO | WO 2015-006697 | 1/2015 | |
| WO | WO 2015/193819 A2 | 12/2015 | |
| WO | WO 2017/014784 A1 | 1/2017 | |
| WO | WO 2017/083255 A1 | 5/2017 | |
| WO | WO 2017/116678 A1 | 7/2017 | |
| WO | WO 2017/116679 A1 | 7/2017 | |
| WO | WO 2017/117035 A1 | 7/2017 | |
| WO | WO 2017-127392 | 7/2017 | |
| WO | WO 2017/127561 A1 | 7/2017 | |
| WO | WO 2017-127569 | 7/2017 | |
| WO | WO 2017-127572 | 7/2017 | |
| WO | WO 2018-118956 | 6/2018 | |
| WO | WO 2017-173009 | 10/2018 | |

OTHER PUBLICATIONS

Goodridge, "Laser Sintering of Polyamides and Other Polymers", Progress in Materials Science, 2012, vol. 57, pp. 229-267.
Rietzel, "Materials: New Thermoplastic Powder for Selective Laser Sintering", Kunststoffe International-Online Magazine for Plastics, Jan. 2008, vol. 98, No. 2, pp. 42-45.
Wendel, "Additive Processing of Polymers", Macromolecular Materials and Engineering, 2008, vol. 293, pp. 799-809.
https://www.ifam.fraunhofer.de/en/Profile/Locations/Dresden.html, 7 pages.
International Search Report for PCT International Application No. PCT/US2017/014156, dated Apr. 28, 2017, 4 pages.
International Search Report for PCT International Application No. PCT/US2017/014174, dated May 11, 2017, 5 pages.
International Search Report for PCT International Application No. PCT/US2017/014181, dated May 3, 2017, 4 pages.
Bommel, "Drying of Silica Gels With Supercritical Carbon Dioxide", Journal of Materials Science, 1994, vol. 29, pp. 943-948.
Francis, "Ternary Systems of Liquid Carbon Dioxide", The Journal of Physical Chemistry, 1954, vol. 58, pp. 1099-1114.
Hintzer, "Fluoropolymer, Organic", Ullmann's Encyclopedia of Industrial Chemistry, 7th Edition, 2013, pp. 35-38.
Logothetis, "Chemistry of Fluorocarbon Elastomers", Progress in Polymer Science, 1989, vol. 14, No. 2, pp. 251-296.
McHugh, "Supercritical Fluid Extraction: Principles and Practice", Department of Chemical Engineering, 2nd Edition, 1986, pp. 1-10.
Scheirs, "Modern Fluoropolymers: High Performance Polymers for Diverse Applications", Wiley Series in Polymer Science, 1997, pp. 1-6.
Smith, Handbook of Fluoropolymer Sceince and Technology, 377-391, (2014).
International Search Report for PCT International Application No. PCT/IB2018/055355, dated Feb. 8, 2019, 7 pages.
International Search Report for PCT International Application No. PCT/US2018/040234, dated Oct. 19, 2018, 6 pages.

* cited by examiner

ADDITIVE PROCESSING OF FLUOROPOLYMERS

CROSS REFERENCE TO RELATED APPLICATIONS

This application is a national stage filing under 35 U.S.C. 371 of PCT/US2017/014156, filed Jan. 19, 2017, which claims the benefit of Provisional Application No. 62/281,349, filed Jan. 21, 2016, and Provisional Application No. 62/385,439, filed Sep. 9, 2016 and Provisional Application No. 62/408,504, filed Oct. 14, 2016, the disclosures of which are incorporated by reference in their entirety herein.

FIELD

The present disclosure relates to additive processing of fluoropolymers and to fluoropolymer articles obtained by additive processing.

BACKGROUND

Fluoropolymers are widely used as raw materials for their chemical inertness, in particular for articles requiring low friction properties and/or inertness to chemicals and heat. Perfluorinated polymers are particularly inert.

Fluoropolymers are typically classified into thermoplastics and elastomers (sometimes also referred to as fluororubbers).

Fluorothermoplastics can be processed by conventional melt shaping methods, such as injection molding and extrusion. Fluorothermoplastics typically are copolymers of tetrafluoroethylene (TFE) with one or more other perfluorinated, partially fluorinated or non-fluorinated comonomers. Copolymers of TFE and perfluorinated alkyl or allyl ethers are knows in the art as PFA's (perfluorinated alkoxy polymers). Copolymers of TFE and hexafluoropropylene (HFP) with or without other perfluorinated comonomers are known in the art as FEP's (fluorinated ethylene propylene). Copolymers of TFE, HFP and vinylidenefluoride (VDF) are known in the art as THV. Other types of melt-processable fluoropolymers are based on vinylidenefluoride homo- or copolymers, known in the art as PVDF. Copolymers of TFE and ethylene are known as ETFE.

Certain types of thermoplastics, have a very high melt viscosity (low melt flow index (MFI) and are termed in the art as "non-melt processable". Non-melt processable fluoropolymers include homopolymers of TFE or copolymers of TFE with other copolymerizable perfluorinated monomers, wherein the amount of comonomers is limited to less than 1% wt. Such TFE homo- and copolymers are referred to in the art as PTFE. PTFE has such a high melt viscosity that it cannot be processed by conventional melt processing techniques such as extrusion, injection molding or blow molding. Homopolymers of tetrafluoroethylene (TFE) or copolymers of TFE with other copolymerizable perfluorinated monomers, wherein the amount of comonomers is limited to less than 1% by weight based on the weight of the polymer, are referred to in the art as polytetrafluoroethylene (PTFE). PTFE and other comonomers of tetrafluoroethylene with a comparable high melt viscosity (low melt flow rate) cannot be shaped by conventional melt processing techniques such as extrusion, injection molding or blow molding. PTFE articles typically are formed by ram extrusion, or by presssintering PTFE particles into billets that are then machined into the desired shape. These are subtractive methods where material is removed to shape articles.

In WO2007/133912 A2 an additive manufacturing process for special thermoplastic fluoropolymers (PVDF and PCTF) are described but examples are not provided. In CN103709737 A and CN 105711104 A methods for 3D printing are described where the use of PTFE is mentioned. The materials are processed by irradiating a polymer powder with infrared or lasers and melting the powder in selected areas exposed to the IR- or laser irradiation. These methods are known in the art of 3D-printing as laser melting or laser sintering. In U.S. Pat. No. 7,569,273 B2 a different method is described that is reported to be suitable for PVDF. Examples are also not provided. The method described in U.S. Pat. No. 7,569,273 B2 involves adding a fluid through a nozzle to a solid composition comprising the polymer and an adhesive particulate material. The articulate material becomes adhesive upon contact with the fluid and thus is reported to create an article by distributing the fluid on selected areas.

There is a need for providing alternative methods of processing fluoropolymers by additive processing and in particular there is a need for processing fluoropolymers of the non-melt processible type.

SUMMARY

In one aspect there is provided a method of producing a fluoropolymer article comprising subjecting a composition comprising fluoropolymer particles to additive processing in an additive processing device containing at least one energy source wherein the composition comprises at least one binder material capable of binding the fluoropolymer particles to form a layer in part of the composition that has been exposed to the energy source of the additive processing device and the method comprises subjecting a part of the composition to exposure of the energy source to form a layer and wherein the binder material is polymerizable and solidifies through polymerization upon exposure of the composition to the energy source of the additive processing device.

In another aspect there is provided a composition for producing an article by additive processing, said composition comprising fluoropolymer particles and comprising a polymerizable binder material capable of binding fluoropolymer particles by polymerizing and solidifying to bind fluoropolymer particles upon exposure of the composition to energy from an energy source of an additive processing device.

In a further aspect there is provided the use of the composition in additive processing.

In another aspect there is provided a 3D-printed fluoropolymer, wherein the 3D-printed fluoropolymer has a density of more than 2.00 g/cm$^3$ and/or a void content (Voi) of less than 200%, preferably between 1% and 185%, more preferably less than 20%, most preferably between 1% and 15%, and wherein the fluoropolymer has a melt flow index at 372° C. and 5 kg load (MFI 372/5) of less than 50 g/10 min, preferably less than 1 g/10 min, more preferably less than 0.1 g/10 min.

In yet another aspect there is provided an article comprising the 3D-printed fluoropolymer.

DETAILED DESCRIPTION

Figure 1:
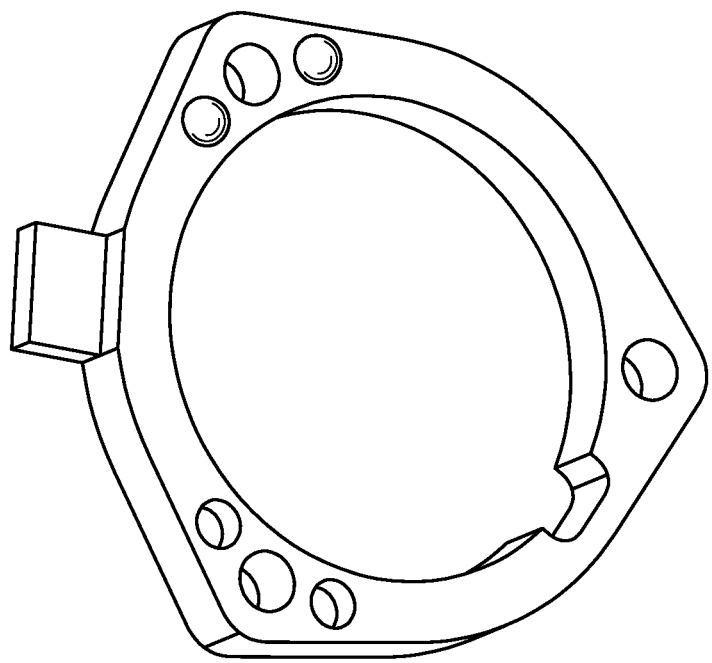
FIG. 1 shows a drawing of a fluoropolymer article to be prepared by additive processing according to the present disclosure.

Before any embodiments of this disclosure are explained in detail, it is to be understood that the disclosure is not limited in its application to the details of construction and the arrangement of components set forth in the following description. Also, it is to be understood that the phraseology and terminology used herein is for the purpose of description. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein describing a physical parameter or amounts and concentration of ingredients is intended to include all values from the lower value to the upper value of that range and including its endpoints. For example, a concentration range of from 1% to 50% is intended to be an abbreviation and to expressly disclose the values between the 1% and 50%, such as, for example, 2%, 40%, 10%, 30%, 1.5%, 3.9% and so forth.

All references cited herein are incorporated by reference unless stated otherwise.

Unless specified otherwise, cited norms (e.g., DIN, ASTM, ISO etc) are the versions in force in Jan. 1, 2016. In case a norm had expired before Jan. 1, 2016 the most recent active version is meant.

3D-printed fluoropolymers and fluoropolymer articles can be prepared by additive processing of compositions comprising fluoropolymers, in particular non-melt processable fluoropolymers.

The fluoropolymers are provided as a composition that is suitable for additive processing. The composition can then be processed into a three dimensional article by additive processing in an additive processing device. Such 3D-printable compositions contain the fluoropolymer and a reactive material comprising a polymerizable binder material that is capable of binding the fluoropolymer particles into a volume element upon exposure to an energy source, typically that of the additive processing device.

Although referred to herein as "binder" material, no formation of a chemical bond (e.g., to the fluoropolymer material) has to occur. The interaction may be physical or chemical or both, but should be sufficient to keep the fluoropolymer particles in a defined position by the polymerized binder material.

Fluoropolymer containing layers may be created successively to form a three-dimensional article.

After the creation of the article in the additive processing device, the polymerized binder material mas be removed. Typically, this can be achieved by heat treatment, which may include degradation or combustion of the polymerized binder material. As an alternative, or as an addition, the polymerized binder material may be extracted with a solvent, for example with liquid $CO_2$. After removal of the binder material or parallel to the removal of the binder material the article may be subjected to a further heat treatment step, for example to sintering. The heat treatment steps can be carried out at ambient pressure (1 bar) and no increased pressure has to be applied to prepare the article (although if advantageous, it may be).

An advantage of the methods and compositions provided herein is that not only prototypes of fluoropolymer articles can be produced at low costs, but also that fluoropolymer articles, in particular PTFE articles, of complex shape and design may be created that may not be available through conventional fluoropolymer professing or only at higher costs.

Another advantage of the methods and compositions provided herein is that shaped fluoropolymers, in particular PTFE, may be prepared without applying increased pressure and forces. Therefore, a shaped fluoropolymer and articles can be prepared that are more isotropic, for example shaped fluoropolymer with a low degree of orientation.

Despite using a binder the shaped fluoropolymers, in particular PTFE, may have a high density and/or low void content.

Another advantage of the methods and compositions provided herein is that fluoropolymer articles, in particular PTFE articles, can be prepared that are of small dimension and have complex structures.

A further advantage of the present methods and compositions is that integral fluoropolymer articles, in particular PTFE articles, of complex structure can be prepared.

Yet a further advantage of the methods provided herein is that these methods are less wasteful than prior art methods of "sculpting" blocks of material, because in the present methods, there is less (for instance, if articles are printed to so-called "near net shape" and then sculpted to a final form) or even no wasted material (for instance, if final shapes are directly formed) to sculpt away from the final shaped article, and unreacted 3D printable compositions may be reused in a next 3D print run.

Another advantage of the present methods is that the degree of porosity of the fluoropolymer article, in particular PTFE articles, can be controlled to create article of low or high porosity.

Additive Processing

Additive processing, also known as "3D printing," or "additive manufacturing (AM)," refers to a process to create a three-dimensional object typically by sequential deposition of materials in defined areas, typically by generating successive layers of material. The object is typically produced under computer control from a 3D model or other electronic data source by an additive printing device typically referred to as a 3D printer. The term "3D printer" and "additive processing device" are used herein interchangeably and generally refer to a device by which additive processing can be carried out. The terms "3D-printing" and "3D-printable" are used likewise and mean additive processing and suitable for additive processing.

Additive processing devices are devices by which sequential deposition of material in defined areas can be achieved, typically by deposition of volume elements, such as layers. Successive layers are built up, layer-on-layer, to create a three-dimensional object. Typically, the device is computer-controlled. Further typically, the device creates the object based on an electronic image (blueprint) of the object to be created. The 3D printer contains an energy source that applies energy to a localised area in a 3D-printable composition. The energy applied may be, for example, heat or irradiation or both. The energy source may include a light source, for instance a light source emitting non-visible light, e.g., ultraviolet light (UV light), a laser, e-beam generators, microwave generator and other sourcing capable of focussing energy to defined areas of the 3D-printable composition. The energy source may be moved to defined areas over the surface of the 3D printable composition, or the printable composition may be moved in a defined way towards and away from the energy source, typically all under computer control.

One or even several energy sources may be used, arranged at different positions in the additive processing device. Typically, the additive printing device contains a platform onto which the printable material is provided. The platform, for example, can be moved towards the energy source or away from it, typically, by the distance of the layers to be formed on the platform. Typically this is also done under computer control. The device may further contain a device such as a wiper blade or an injection nozzle by which new printable material is provided and can be applied over the layer formed for successive layer-on-layer building. Support structures may be used and later removed in case the object to be created is complex or requires structural support during its creation. Additive printing devices as known and that are commercially available can be used for the methods provided herein.

According to the present disclosure, the volume elements or layers are formed by using a 3D printable composition containing fluoropolymer particles and a reactive material comprising a polymerizable binder material. Exposure of the composition to the energy source of the device, or more precisely, to the energy emitted from the energy source, causes the polymerizable binder material to polymerize. Typically, the material's viscosity increases, it solidifies in the areas exposed to the energy source through polymerization. A typical example of this type of additive manufacturing technique is known in the art as 'stereolithography' (SL) or 'vat polymerization' (VP) although other 3D printing methods may be used. This type of additive manufacturing process works by focussing electromagnetic irradiation (including, for example UV light) on to a vat of 3D printable composition containing polymerizable material. The 3D printable composition is typically a liquid. With the help of computer aided manufacturing or computer aided design software (CAM/CAD), the irradiation is used to draw a pre-programmed design or shape on to the surface of the 3D-printable composition. Because the 3D-printable composition is reactive to the irradiation, the composition becomes more viscous, solidified or gels and forms a single layer of the desired 3D object on the areas exposed to the irradiation. This process is repeated for each layer of the design until the 3D object is complete. Typically, the 3D printer used for stereolithography contains an elevator platform that descends a distance equal to the thickness of a single layer of the design (typically 0.05 mm to 0.15 mm, or 0.001 mm to 0.15 mm) into the vat containing the 3D printable composition before a new layer is formed by irradiation. A blade filled with new printable material may sweep across a cross section of the layer, re-coating it with fresh material. Alternatively a nozzle may be used or other devices of providing new printable material. The subsequent layer is traced, joining the previous layer. A complete 3D object can be formed using this process. Depending on the design of the additive processing device another typical method raises or lowers the build platform further than one layer or volume element so that the printable material is able to flow easily over the previous layer/volume element. Up returning to the desired step height the previous layer is uniformly covered. The subsequent is traced joining the previous layer. Although described in greater detail for stereolithography, the 3D printable compositions may be used in other 3D printing methods as well. For example, 3D printable compositions according to the present disclosure that are viscous compositions or extrudable pastes can be processed by extruding the composition through an extruder on the selected location of a build platform. The energy source may be placed on the exit of the extruder or elsewhere and the material extruded on the platform is irradiated at the selected location to cause the binder material to polymerize and to form a volume element. This step is repeated until an object is formed.

Preferably, irradiation with light (preferably UV light) is used and the polymerizable binder material used in the 3D printable composition is reactive to light, or UV light, or is reactive to initiators that are activated by light or UV light as the case may be. However, irradiation with other wavelengths may also be used, for example from the visible or invisible light (e.g. IR) and including X-rays and e-beams. In that case a polymerizable material is chosen that is reactive to such irradiation or that is reactive to polymerization initiators that are activated in such irradiation.

Conditions for effective irradiation may vary depending on the type of irradiation used and the type of polymerizable materials chosen. Polymerizable materials and polymerization initiators may be selected that are responsive to varies types of irradiation for example to irradiation with visible or invisible lights. For example irradiation with light of wavelengths from 1 to 10,000 nm, for example but not limited to 10 to 1,000 nm may be used. The irradiation may be monochromatic or polychromatic depending on the reactivity of the polymerizable system chosen.

UV irradiation typically includes irradiation with a wavelength between 10 and 410 nm. UV irradiation may be generated from a UV source, like a laser, a mercury lamp or UV LEDs. UV LEDs (light emitting diodes, LED) are commercially available that produce monochromatic irradiation at wave length of 365 nm, 385 nm and 405 nm within an error margin of +/−10 nm.

Infrared irradiation typically includes irradiation with electromagnetic waves of a wave length from 1 mm to 750 nm. Irradiation with visible light typically includes irradiation with a wave length between 410 and 760 nm.

Depending on the complexity of the article design supporting structures may be attached to the elevator platform to prevent deflection or delamination due to gravity and to hold cross sections in place in order to resist lateral pressure from the resin-filled blade.

The methods provided herein can be carried out in known and commercially available additive printing devices for stereolithography or vat polymerization. Typical known methods and their 3D printer have been described, for example, in "Additive Processing of Polymers" by B. Wendel et al in *Macromol. Matter. Eng.* 2008, 293, 799-809. Examples of commercially available 3D printers include, but are not limited to 3D printers from ASIGA, Anaheim, Calif., USA for vat polymerization printing. However, also other 3D printing methods may be used. For example the 3D-printable compositions may be extruded as pastes through one or more nozzles and subjected to the energy source upon which the binder polymerizes. Examples include printers from Hyrel 3D, Norcross, Ga. 30071, such as Hyrel System 30M printer with extrusion heads. In such printers the 3D-printable compositions are adjusted by their compositions to have the required viscosity, for example by increasing the polymer content.

3D-Printable Compositions

The compositions provided in the present disclosure comprise one or more fluoropolymer, a reactive material comprising one or more polymerizable binder materials and one or more optional ingredients. The compositions may be dispersions of the fluoropolymer in a liquid medium, or in the polymerizable binder material. The compositions are preferably liquid compositions, more preferably aqueous compositions. In one embodiment, the compositions are extrudable compositions, such as pastes. The compositions are suitable for additive processing. Therefore, the compositions are also referred to herein as "3D-printable compositions." The compositions and their ingredients will be described in greater detail below.

Fluoropolymers

The 3D printable compositions of the present disclosure contain fluoropolymers. Suitable fluoropolymers include homopolymers of tetrafluoroethylene (PTFE) and copolymers of tetrafluoroethylene with one or more perfluorinated comonomers. Perfluorinated comonomers include perfluorinated alpha olefins and perfluorinated alpha olefin ethers, i.e. olefins where the carbon-carbon double bond is in a terminal position.

Perfluorinated alpha olefins include compounds according to the formula:

$$R^f—CX^3=CX^1X^2$$

wherein $X^1$, $X^2$, $X^3$ are either all F or two of $X^1$, $X^2$ and $X^3$ are F and one is Cl. $R^f$ is a linear or branched alkyl radical of 1-12 carbon atoms and of which all hydrogen atoms have been replaced by fluorine atoms. Examples include hexafluoropropylene(HFP) and chlorotrifluoroethylene (CTFE).

Examples of perfluorinated alpha olefin include ethers of the formula $$R^r—O—(CF_2)_n—CF=CF_2,$$

wherein n represents 1, in which case the compounds are referred to as allyl ethers, or 0, in which case the compounds are referred to as vinyl ethers, $R^f$ represents a linear or branched, cyclic or acyclic perfluorinated alkyl residue containing at least one catenary oxygen atom (in the context of this application, unless specified otherwise or implied by otherwise by the context, catenary atom means an ether-oxygen atom). $R^f$ may contain up to 8, preferably, or up to 6 carbon atoms, such as 1, 2, 3, 4, 5 and 6 carbon atoms. Typical examples of $R^f$ include linear or branched alkyl residues interrupted by one oxygen atom, and linear or branched alkyl residues containing 2, 3, 4 or 5 catenary ether oxygens. Further examples of $R^f$ include residues containing one or more of the following units and combinations thereof: —(CF$_2$O)—, —(CF$_2$CF$_2$—O—), (—O—CF$_2$)—, —(O—CF$_2$CF$_2$)—, —CF(CF$_3$)—, —CF(CF$_2$CF$_3$)—, —O—CF(CF$_3$)—, —O—CF(CF$_2$CF$_3$)—, —CF(CF$_3$)—O—, —CF(CF$_2$CF$_3$)—O—.

Further examples of $R^f$ include but are not limned to:
—(CF$_2$)$_{t1}$—O—C$_3$F$_7$,
—(CF$_2$)$_{t2}$—O—C$_2$F$_5$,
—(CF$_2$)$_{t3}$—O—CF$_3$,
—(CF$_2$—O)$_{s1}$—C$_3$F$_7$,
—(CF$_2$—O)$_{s2}$—C$_2$F$_5$,
—(CF$_2$—O)$_{s3}$—CF$_3$,
—(CF$_2$CF$_2$—O)$_{r1}$—C$_3$F$_7$,
—(CF$_2$CF$_2$—O)$_{r2}$—C$_2$F$_5$,
—(CF$_2$CF$_2$—O)$_{r3}$—CF$_3$, wherein r1 and s1 represent 1, 2, 3, 4, or 5, r2 and s2 represent 1, 2, 3, 4, 5 or 6, r3 and s3 represent 1, 2, 3, 4, 5, 6 or 7; t1 represents 1 or 2; t2 and t3 represent 1, 2 or 3.

Specific examples of suitable perfluorinated alkyl vinyl ether comonomers include
F$_2$C=CF—O—CF$_3$
F$_2$C=CF—O—C$_2$F$_5$
F$_2$C=CF—O—C$_3$F$_7$
F$_2$C=CF—O—CF$_2$O—(CF$_2$)—F,
F$_2$C=CF—O—CF$_2$—O—(CF$_2$)$_2$—F,
F$_2$C=CF—O—CF$_2$—O—(CF$_2$)$_3$—F,
F$_2$C=CF—O—CF$_2$—O—(CF$_2$)$_4$—F,
F$_2$C=CF—O—(CF$_2$)$_1$—OCF$_3$,
F$_2$C=CF—O—(CF$_2$)$_3$—OCF$_3$,
F$_2$C=CF—O—(CF$_2$)$_4$—OCF$_3$,
F$_2$C=CF—O—(CF$_2$)$_3$—(OCF$_2$)$_2$—F,
F$_2$C=CF—O—CF$_2$—(OCF$_2$)$_3$—CF$_3$,
F$_2$C=CF—O—CF$_2$—(OCF$_2$)$_4$—CF$_3$,
F$_2$C=CF—O—(CF$_2$O)$_2$—OCF$_3$,
F$_2$C=CF—O—(CF$_2$O)$_3$—OCF$_3$,
F$_2$C=CF—O—(CF$_2$O)$_4$—OCF$_3$.

Specific examples of suitable perfluorinated alkyl allyl ether comonomers include:
F$_2$C=CF—CF$_2$—O—CF$_3$
F$_2$C=CF—CF$_2$—O—C$_2$F$_5$
F$_2$C=CF—CF$_2$—O—C$_3$F$_7$
F$_2$C=CF—CF$_2$—O—CF$_2$—O—(CF$_2$)—F,
F$_2$C=CF—CF$_2$—O—CF$_2$—O—(CF$_2$)$_2$—F$_2$C=CF—CF$_2$—O—CF$_2$—O—(CF$_2$)$_2$—F,
F$_2$C=CF—CF$_2$—O—CF$_2$—O—(CF$_2$)$_2$—F$_2$C=CF—CF$_2$—O—CF$_2$—O—(CF$_2$)$_3$—F,
F$_2$C=CF—CF$_2$—O—CF$_2$—O—(CF$_2$)$_2$—F$_2$C=CF—CF$_2$—O—CF$_2$—O—(CF$_2$)$_4$—F,
F$_2$C=CF—CF$_2$—O—(CF$_2$)$_2$—OCF$_3$,
F$_2$C=CF—CF$_2$—O—(CF$_2$)$_3$—OCF$_3$,
F$_2$C=CF—CF$_2$—O—(CF$_2$)$_4$—OCF$_3$,
F$_2$C=CF—CF$_2$—O—(CF$_2$)$_3$—(OCF$_2$)$_2$—F,
F$_2$C=CF—CF$_2$—O—CF$_2$—(OCF$_2$)$_3$—CF$_3$,
F$_2$C=CF—CF$_2$—O—CF$_2$—(OCF$_2$)$_4$—CF$_3$,
F$_2$C=CF—CF$_2$—O—(CF$_2$O)$_2$—OCF$_3$,
F$_2$C=CF—CF$_2$—O—(CF$_2$O)$_3$—OCF$_3$,
F$_2$C=CF—CF$_2$—O—(CF$_2$O)$_4$—OCF$_3$.

Particular examples of perfluorinated alkyl allyl ether (PAAE's) include unsaturated ethers according to the general formula:

$$CF_2=CF—CF_2—OR^f$$

wherein $R^f$ represents a linear or branched, cyclic or acyclic perfluorinated alkyl residue. $R^f$ may contain up to 10 carbon atoms, e.g. 1, 2, 3, 4, 5, 6, 7, 8, 9 or 10 carbon atoms. Preferably $R^f$ contains up to 8, more preferably up to 6 carbon atoms and most preferably 3 or 4 carbon atoms. $R^f$ may be linear, branched and it may contain or not contain a cyclic unit. Specific examples of $R^f$ include perfluoromethyl (CF$_3$), perfluorotheyl (C$_2$F$_5$), perfluoropropyl (C$_3$F$_7$) and perfluorobutyl (C$_4$F$_9$), preferably C$_2$F$_5$, C$_3$F$_7$ or C$_4$F$_9$. In a particular embodiment $R^f$ is linear and is selected from C$_3$F$_7$ or C$_4$F$_9$.

In addition to using one comonomer with TFE, the present description also contemplates the use of a combination of the above comonomers.

Perfluorinated alkyl allyl ethers and alkyl vinyl ethers as described above are either commercially available, for example from Anles Ltd. St. Peterburg, Russia or can be prepared according to methods described in U.S. Pat. No. 4,349,650 (Krespan) or international patent application no. WO 01/46107 (Worm et al) or in Modern Fluoropolymers, J. Scheirs, Wiley 1997 and the references cited therein or by modifications thereof as known to the skilled person.

The comonomer content of perfluorinated comonomers in particular in case of HFP or CTFE as comonomers, may be up to 20% by weight, or up to 12% by weight. In one embodiment the content of perfluorinated comonomers is 1% by weight or less. Preferably the fluoropolymers contain 0% by weight of comonomers other than the perfluorinated comonomers. In one embodiment the polymers contain less than 2% by weight, preferably less than 1% by weight of copolymers other than the perfluorinated comonomers. Polymers of tetrafluoroethylene and perfluorinated comonomers and no other comonomers are referred to herein as "perfluorinated" polymers.

In a preferred embodiment the fluoropolymer is a copolymer of TFE and one or more perfluorinated comonomers, preferably selected from HFP, CTFE, a perfluoroalkyl vinyl ether or a perfluoroalkyl allyl ether or combinations thereof. The amount of the perfluorinated comonomers may be up to 12% by weight based on the total weight of the fluoropolymer, preferably up to 1% or more preferably up to 0.1% by weight. Preferably the copolymer is prefluorinated (i.e. it does not contain any other comonomers).

In one embodiment the fluoropolymer contains TFE and one or more perfluoroalkyl vinyl ether comonomer and no other comonomer. In another embodiment the fluoropolymer contains TFE and one or more perfluoroalkyl allyl ether comonomer and no other comonomer. In yet another embodiment the fluoropolymer contains a combination of PAVE and PAAE comonomers and no other comonomers. Typically, the amount of the comonomers is up to 2 wt % or up to 1 wt % or up to 0.1 wt %. Typical amounts include, for example, from about 0.1 to 2, or from 0.1 to 1 percent by weight or from 0.3 to 1 percent by weight (all based on the total weight of the polymer).

Typically such fluoropolymer as described above have a low melt-flow index, i.e a high melt viscosity. Therefore, such polymers are referred to herein as "not melt-processable" or "non-melt-processable" as they cannot be processed like ordinary thermoplastic polymers.

In one embodiment of the present disclosure the fluoropolymers include those having a melt flow index (MFI) of 1.0 g/10 min or less at 372° C. using a 5 kg load (MFI 372/5 of less than 1.0 g/10 min), preferably a melt flow index (372/5) of 0.1 g/10 minutes or less.

Typically, the fluoropolymers of the present disclosure have a melting point of at least 300° C., preferably at least 315° C. and typically within the range of 327+/−10° C. In some embodiments, the fluoropolymers have a melting point of at least 317° C., preferably at least 319° C. and more preferably at least 321° C. The melting point of not melt-processable fluoropolymers differs when the material is molten for the first time and afterwards. After the material has been molten once the meting point in subsequent melting remains constant. Therefore, the melting point as referred to herein is the melting of the once molten material (i.e. the material is brought to the melt, is cooled below its melting point and then molten again).

The non-melt-processable fluoropolymers may have a standard specific gravity (SSG) of between 2.13 and 2.23 g/cm³ as measured according to ASTM 4895. The SSG is a measure for the molecular weight of the polymer. The higher the SSG, the lower the molecular weight. In one embodiment ultra-high molecular weight PTFEs are used in the present disclosure, which means PTFE polymers having an SSG of less than 2.17 g/cm³, for example an SSG of between 2.14 and 2.16. Such PTFE polymers and their preparation is described, for example, in WO2011/139807.

The non-melt-processable fluoropolymers may have different polymer architectures and can be, for example core-shell polymers, random polymers or polymers prepared under continuous and constant polymerization conditions.

Fluoropolymers with a melt flow index (MFI) of 1.0 g/10 min or less at 372° C. using; a 5 kg load (MFI 372/5 of less than 1.0 g/10 min), preferably a melt flow index (372/5) of 0.1 g/10 minutes or less, have such a high melt viscosity that they retain their shape despite being at temperature above their melting points. This is advantageous for removing binder material by heat treatment and to provide dense fluoropolymer articles.

However, also "melt processable" fluoropolymers may be used in the methods of the present disclosure. Such fluoropolymers include copolymers of TFE. The same comonomers and combinations of comonomers as described above can be used. In addition ethylene or propylene can be used as additional comonomers. Melt-processable fluoropolymers include copolymers of TFE with perfluorinated, partially fluorinated or non-fluorinated comonomers, wherein the comonomer content is greater than 1% wt, or greater than 3% by weight and may be up to 30% wt (as used hereinabove and below the weight percentages are based on total weight of the polymer—unless specified otherwise). Melt-processable fluoropolymers (also referred to as "thermoplasts" or "thermoplastics" include but are not limited to: FEP (copolymers of TFE, HFP and other optional amounts of perfluorinated vinyl ethers); THV (copolymers of TFE, VDF and HFP), PFA (copolymers of TFE and perfluoro alkyl vinyl ethers and/or perfluoro alkyl allyl ethers) homonomers and copolymers of VDF (PVDF) and homo- and copolymers of chlortrifluoroethylene (CTFE) and copolymers of TFE and ethylene (ETFE).

Fluorothermoplasts are described, for example, in "Fluoropolymer, Organic" in Ullmann's Encyclopedia of industrial chemisty, 7th edition, 2013, Wiley-VCH Verlag Chemie, Weinheim, Germany.

Preferred melt-processable fluorothermoplasts include fluoropolymers with a melting point between 260 and 315° C., preferably 280° C. to 315° C.

The melt-processable fluorothermoplasts have a melt flow index of greater than 1.0 g/10 min (MFI (372° C./5 kg)) and preferably from 1.1 to 50 g/10 min, more preferably from 1 to 20 or 1 to 5 g/10 minutes.

In one embodiment the melt processable fluorothermoplasts are PFAs. PFAs are copolymers of TFE and at least one perfluoro alkyl vinyl ethers (PAVE's), perfluoro alkyl allyl ethers (PAAE) and combinations thereof. Typical amounts of copolymers range from 1.7% to 10% wt. Preferably, the PFAs have a melting point between 280° C. and 315° C., for example between 280° C. and 300° C.

Fluorothermoplast with MFI's greater than 50 g/10 min (MFI 372/5) may also be used in the methods of the present disclosure. For polymers with greater MFI's may also be used by the present methods. In one embodiment, fluorothermoplasts with MFI's greater than 50 g/10 min (MFI 372/5) and/or with melting points below 300° C. or 280° C., or below 200° C. may be used, for example fluorothermoplasts with melting points between 150° C. and 280° C. It is believed that these fluoropolymers require a milder heat treatment in the work-up procedure to avoid structural stability. The binder material may be removed not thermally but, for example, by solvent extraction, or binder material may be chosen that can be removed at low temperatures. Such materials may also preferably be processed as pastes and the 3D printable compositions may contain no water or only low amounts of water. This would avoid or reduce the heat treatment necessary to remove residual water in the work-up procedure.

The fluorothermoplasts may be linear or branched, for example in case they contain branched comonomers like HFP. Longer branches may be created by using branching modifiers in the polymerization as described, for example in WO2008/140914 A1.

Favourably, the fluoridated polymers are dispersed in the 3D-printable compositions. Preferably, the fluorinated polymers have a small particle size to allow for a homogenous dispersion. Typically, the particle size corresponds to particles sizes obtained by preparing fluoropolymers in an aqueous emulsion polymerization as known in the art. The fluoropolymers typically have a particle sizes of less than 2,000 nm. Preferably, the fluoropolymer particles have an average particle size ($D_{50}$) of from 50 to 500 nm, or from 70 to 350 nm. Using fluoropolymers of small particle sizes, for example particle sizes typically obtained by emulsion polymerisation of fluoropolymers, where the resulting fluoropolymers have an average particle size ($D_{50}$) of from 50 to 500 nm, or from 70 to 350 nm, may favour the creation of dense fluoropolymer articles, for example shaped fluoropolymers with a high density and/or low void content. However, in application where no dense articles but rather porous article are desired, larger particle size or different heat treatment or sintering schemes can be applied. The porosity of the resulting shaped article may be controlled this way.

In the 3D-printable compositions the fluoropolymers may be dispersed in the binder material or in a dispersing medium, for example water or a solvent or a combination thereof. Preferably, the 3D-printable compositions are aqueous compositions. In a convenient way to prepare homogeneous 3D-printable compositions, an aqueous dispersion of the fluoropolymers is provided to which the other ingredients are added. Extrudable compositions may be created from dispersions that may then be upconcentrated, for example by removing water content through evaporation or thermal treatment. Another way of making extrudable pastes includes suspending or dispersing coagulated fluoropolymers in suitable solvents and combining them with the binders or other optional ingredients.

The fluoropolymers described herein and the aqueous fluoropolymer dispersions can be conveniently prepared by aqueous emulsion polymerization as described, for example, in U.S. Pat. No. 2,965,595, EP 1,533,325 and EP 0,969,027. However, the fluoropolymers may also be obtained by suspension polymerization.

Various grades of fluoropolymers fluoropolymer dispersions as described herein are commercially available, for example from Dyneon GmbH, Burgkirchen Germany and from other fluoropolymer producers.

Generally, the amount of fluoropolymers, in particularly not melt-processable fluoropolymers, in the 3D-printable compositions may include but are not limited to from about 25-70%, 30-60%, 25 to 60%, 40-55% or from about 30 to 50% or from about 31 to 45% (percent by weight, based on the total weight of the composition). The optimum concentration may depend on the type and amounts of the other ingredients, for example the binder material and the type of 3D printer used. Too high concentrations of fluoropolymer may lead to the formation of viscous compositions that may be difficult to process in some types of 3D printers, for example VAT polymerization of stereolithography. In that case, the fluoropolymer concentration could be lowered or the composition can be diluted, for example by adding water, solvent or another dispersing medium. Other 3D-printing methods require more viscous compositions such as pastes, for example printers operating with paste extrusions.

The fluoropolymers used in the 3D-printable compositions are preferably prepared by aqueous emulsion polymerization. Preferably, they are provided aqueous dispersions. The polymerization is typically carried out with fluorinated emulsifiers. The fluorinated emulsifiers stabilise the fluoropolymer dispersion. Typical emulsifiers include those that correspond to the formula

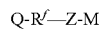

Q-R$^f$—Z-M wherein Q represents hydrogen, Cl or F, whereby Q may be present in a terminal position or not, R$^f$ represents a linear or cyclic or branched perfluorinated or partially fluorinated alkylene having 4 to 15 carbon atoms, Z presents an acid anion, such as COO$^-$ or SO$_3^-$ and M represents a cation including an alkali metal anion or an ammonium ion. Examples fluorinated emulsifiers include those described in EP 1 059 342, EP 712 882, EP 752 432, EP 86 397, U.S. Pat. Nos. 6,025,307, 6,103,843, 6,126,849, 5,229,480, 5,763,552; 5,688,884, 5,700,859, 5,895,799, WO00/22002 and WO00/71590.

Typical examples include but are not limited to emulsifiers of the general formula:

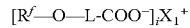

[R$^f$—O—L-COO$^-$]$_i$X$_1^+$ wherein L represents a linear or branched or cyclic, partially or fully fluorinated alkylene group or an aliphatic hydrocarbon group, R$^f$ represents a linear or branched, partially or fully fluorinated aliphatic group or a linear or branched partially or fully fluorinated group interrupted once or more than once with an oxygen atom, X$_i^+$ represents a cation having the valence i is 1, 2 and 3. In case the emulsifier contains partially fluorinated aliphatic group it is referred to as a partially fluorinated emulsifier. Preferably, the molecular weight of the emulsifier is less than 1,000 g/mole.

Specific examples are described in, for example, US Pat. Publ. 2007/0015937 (Hintzer et al.). Exemplary emulsifiers include: CF$_3$CF$_2$OCF$_2$OCF$_2$COOH, CHF$_2$(CF$_2$)$_5$COOH, CF$_3$(CF$_2$)$_6$COOH, CF$_3$O(CF$_2$)$_3$OCF(CF$_3$)COOH, CF$_3$CF$_2$CH$_2$OCF$_2$CH$_2$OCF$_2$COOH, CF$_3$O(CF$_2$)$_3$OCHFCF$_2$COOH, CF$_3$O(CF$_2$)$_3$OCF$_2$COOH, CF$_3$(CF$_2$)$_3$(CH$_2$CF$_2$)$_2$CF$_2$CF$_2$CF$_2$COOH, CF$_3$(CF$_2$)$_2$CH$_2$(CF$_2$)$_2$COOH, CF$_3$(CF$_2$)$_2$COOH, CF$_3$(CF$_2$)$_2$(OCF(CF$_3$)CF$_2$)OC(CF$_3$)COOH, CF$_3$(CF$_2$)$_2$(OCF$_2$CF$_2$)$_4$OCF(CF$_3$)COOH, CF$_3$CF$_2$O(CF$_2$CF$_2$O)$_3$ CF$_2$COOH, and their salts.

Therefore, in one embodiment, the 3D-printable compositions may contain one or more fluorinated emulsifiers. Typically, their amount is low (100 ppm or less or 50 ppm or less based on the weight of the composition in any event as low as 10 ppm, 5 ppm, or even low enough to be below the detection limits of the available analytical methods (therefore nominally 0 ppm, 0 ppb, or 0 ppt, depending on the limits of the chosen method)) because the fluorinated emulsifiers may be removed in the work up procedure, for example as described in WO03/051988.

The 3D-printable compositions may comprise one or more stabilizing surfactant. The surfactants may be fluorinated or non-fluorinated and preferably are non-fluorinated. Typically they are non-ionic or amphoteric. Preferred are emulsifiers that provide sufficient shear stability to the fluoropolymer dispersion but degrade or evaporate at the heat process in the work up procedure.

In one embodiment the 3D-printable compositions provided herein may contain one or more stabilizing emulsifiers. Optimum amounts may vary and depend on the binder material and ratio of binder material to fluoropolymer, foaming properties of surfactants, compatibility of the surfactants with the other ingredients, surface-activity of the surfactants and foaming properties of the surfactants because too much foaming may not be suitable. Typical amounts of stabilizing emulsifiers are 0.5 to 12% by weight based on the weight of the 3D-printable composition.

Examples of stabilizing emulsifiers include but are not limited to ethoxylated alcohols, amine oxide surfactants and ethxoyated amine surfactants as will be described in greater detail below.

Ethoxylated Alcohol Surfactants

Examples of non-ionic surfactants can be selected from the group of alkylarylpolyethoxy alcohols (although not preferred), polyoxyalkylene alkyl ether surfactants, and alkoxylated acetylenic diols, preferably ethoxylated acetylenic diols, and mixtures of such surfactants.

In particular embodiments, the non-ionic surfactant or mixture of non-ionic surfactants corresponds to the general formula:

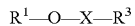
$R^1$—O—X—$R^3$ wherein $R^1$ represents a linear or branched aliphatic or aromatic hydrocarbon group that may contain one or more catenary oxygen atoms and having at least 8 carbon atoms, preferably 8 to 18 carbon atoms. In a preferred embodiment, the residue $R^1$ corresponds to a residue (R')(R")C— wherein R' and R" are the same or different, linear, branched or cyclic alkyl groups. $R^3$ represents hydrogen or a $C_1$-$C_3$ alkyl group. X represents a plurality of ethoxy units that can also contain one or more propoxy unit. For example, X may represent —[$CH_2CH_2O$]$_n$—[$R^2O$]$_m$—$R^2$ represents an alkylene having 3 carbon atoms, n has a value of 0 to 40, m has a value of 0 to 40 and the sum of n+m is at least 2 and the units indexed by n and m may be arranged at random. Also mixtures of the above emulsifiers may be used. Commercially available non-ionic surfactants or mixtures of non-ionic surfactants include those available from Clariant GmbH under the trade designation GENAPOL such as GENAPOL X-080 and GENAPOL PF 40. Further suitable non-ionic surfactants that are commercially available include those of the trade designation Tergitol TMN 6, Tergitol TMN 100× and Tergitol TMN 10 from Dow Chemical Company.

Amine Oxide Surfactants

In one embodiment the 3D-printable composition may comprise one or more amine oxide surfactants. Such emulsifiers are described, for example, in U.S. Pat. No. 8,097,673 B2.

The amine oxide surfactants may correspond to the formula:

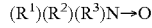
($R^1$)($R^2$)($R^3$)N→O wherein $R^1$ is radical of the formula:

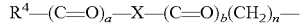
$R^4$—(C=O)$_a$—X—(C=O)$_b$(CH$_2$)$_n$— wherein $R^4$ is a saturated or unsaturated, branched or unbranched, cyclic or acyclic, alkyl hydroxyalkyl, ether or hydroxy ether radical having 1 to 20 carbon atoms, X is an O, NH or $NR^5$, a and b are 0 or 1 with the proviso that a+b=1, and n is 2-6;
wherein $R^2$ and $R^3$ are independently selected front saturated or unsaturated, branched or unbranched, cyclic or acyclic, alkyl, hydroxyalkyl, ether or hydroxyether radical having 1 to 10 carbon atoms optionally substituted with halogen;

$R^5$ is selected from saturated or unsaturated, branched or unbranched, cyclic or acyclic, alkyl, hydroxyalkyl, ether or hydroxyether radical having 1 to 10 carbon atoms optionally substituted with halogen or an N-oxylamino group; and wherein that $R^2$ and $R^3$ may be joined by a chemical bond to form a ring.

If $R^2$, $R^3R^4$ and $R^5$ have halogen substitutions, preferably halogen substitutions are limited such that no more than about 70% of the atoms attached to carbon atoms of the radical are halogen atoms, more preferably no more than about 50% are halogen atoms. Most preferably, $R^2$, $R^3R^4$ are not halogen substituted.

If $R^5$ is substituted with N-oxylamino, groups bonded to the nitrogen atom preferably have 1 to 10 carbon atoms.

In preferred surfactants, R1 is a radical of the formula:

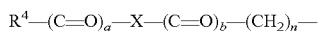
$R^4$—(C=O)$_a$—X—(C=O)$_b$—(CH$_2$)$_n$— wherein $R^4$ comprises alkyl having 1-20 carbon atoms, X is NH, a and b are 0 or 1 with the proviso that a+b=1, and n is 2-4;

In more preferred surfactants, R1 is a radical of the formula:

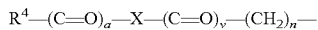
$R^4$—(C=O)$_a$—X—(C=O)$_v$—(CH$_2$)$_n$— wherein $R^4$ comprises alkyl having 5-20 carbon atoms, X is NH, a and b are 0 or 1 with the proviso that a+b=1, and n is 3.

$R^2$ and $R^3$ in the formula:

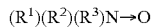
($R^1$)($R^2$)($R^3$)N→O may be independently selected from saturated or unsaturated, branched or unbranched, cyclic or acyclic, alkyl or hydroxyalkyl radical having 1 to 4 carbon atoms.

In one embodiment $R^2$ and $R^3$ in the formula above are each independently selected from alkyl or hydroxyalkyl radicals having 1 to 2 carbon atoms.

Specific examples include cocoamidopropyl dimethyl amine oxide, 2-ethylhexylamidopropyl dimethyl amine oxide, and octylamidopropyl dimethyl amine oxide.

Aminoxide surfactants are commercially available, for example, under the trade designation GENAMINOX from Clariant.

Ethoxylated Amine Surfactants

In another embodiment the 3D-printable compositions may contain one or more ethoxylated amine surfactants. Amine oxide surfactants are described, for example, in U.S. Pat. No. 4,605,773. Ethoxylated amine surfactants may correspond to the formula:

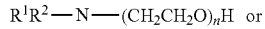
$R^1R^2$—N—(CH$_2$CH$_2$O)$_n$H or

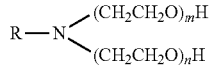
R—N⟨(CH$_2$CH$_2$O)$_m$H / (CH$_2$CH$_2$O)$_n$H with $R^1$, $R^2$ and R being a non-polar residue, such as being independent from each other a branched, linear or cyclic alkyl, alkyloxy or polyoxy alkyl residue. Each non polar residue may comprise, independent from each other, 4 or more, 6 or more, 8 or more and less than 30, more preferably more than 10 and less than 20, most preferably between 6 and 18 C atoms. In some embodiments one or more of the residues $R_1$, $R_2$ or R may be alkyl-substituted (preferably with a methyl or ethyl group) in the 1-position (that is, the position adjacent to the N-atom) or di-alkyl-substituted in the 1-position.

In both formulae above n and m represent an integer and being independently from each other 1, 2, 3, 4, 5, 6, 7, 8, 9, 10, 11, 12, 13 or 14 or 1 to 10, 1 to 6 or 1 to 4. Preferably, the sum of n and m may be less than 30, more preferably less than 25, most preferably less than 20. The sum of n and m may also be 2, 3, 4, 5, 8, 10, 12, 20 or 25.

The total number of C-atoms in the molecule may be less than 50 or less than 40 or less than 20.

In one embodiment one or more residues of the tertiary amine linked to the N-atom may correspond to the formula:

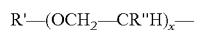

R'—(OCH$_2$—CR"H)$_x$— with R' being hydrogen, a branched, linear or cyclic alkyl or aryl residue and R" being hydrogen or an alkyl group including, for example, a methyl, ethyl, propyl, isopropyl, or butyl group. Preferably, R' is a methyl, ethyl, propyl or isopropyl group;

x represents an integer of from 1, 2, 3, or 1 to 10, 1 to 6 or 1 to 4.

In another embodiment, x is an integer from 1 to 10, R" is H or CH$_3$ and R' is selected from the group consisting of H or straight or branched alkyls, such as methyl, ethyl, propyl, isopropyl etc.

Examples of readily available ethoxylated amines include but are not limited to those marketed under the tradename TRITON RW-Series by Dow Chemical Company, Midland, Mich., USA, such as for example TRITON RW-20, TW-50, RW-70, RW-100, RW-150, or under the trade designation GENAMIN from Clariant, Basel, Switzerland.

Other emulsifiers contemplated as suitable include sugar-based surfactants, such as glycoside surfactants and polysorbates such as described, for example, in WO2011/014715 A2 (Zipplies et al).

As an alternative to using aqueous fluoropolymer dispersions, fluoropolymer coagulated from such dispersions may be used. The coagulated polymer particles may be dispersed in a solvent, typically an organic solvent.

Alternatively, fluoropolymers obtained by suspension polymerization may be used. Typically the resulting particles have a particle size that can be greater than 500 μm.

The preferred particle size of the fluoropolymer particles in the 3D-printable composition is 500 μm or less, preferably 50 μm and less, more preferably 5 μm and less. In any event, practical manufacturing limits may dictate that such particles have a size of 0.1 μm or larger, 0.5 μm or larger, or even 1 μm or larger. In other words, the present description includes the ranges beginning at 0.1, 0.5, or 1 μm and up to 5, 50, or 500 μm (as determined by z-average particle size).

Fluoropolymer particles may be milled to such particle sizes.

Fluoropolymer Blends

In one embodiments, the 3D-printable compositions comprises mixtures of fluoropolymers. For example in one embodiment the composition comprises mixtures of different non-melt processable fluoropolymers, for example polymers of different molecular weight. In one embodiment the composition comprise a mixture of one or more non melt-processable fluoropolymer as described above with one or more PTFE micropowders. PTFE micropowders have the same molecular composition and similar melting points as PTFE's as described above but have a much lower molecular weight and melt viscosity. They have an MFI (372/5) of greater than 0.1 g/10 mins. PTFE micropowders are commercially available and are typically prepared by radiation degradation of high molecular weight PTFE followed by milling. Micropowders are also commercially available, for example from Dyneon GmbH, Burgkirchen Germany or other fluoropolymer producers.

In another embodiment the 3D-printable compositions comprise a blend of one or more non-melt processable fluoropolymer and one or more melt-processable fluoropolymer. The weight ratio of melt processable fluorothermoplasts to non-melt-processable fluoropolymers may be from 1:1 to 1:1000, or from 1:2 to 1:100. The presence of melt processable fluoropolymers in blends with non-melt processable fluoropolymers may lead to a more rapid filling of voids created by the removal of the binder material. This may be advantageous as it may lead to more dense articles after or during a thermal removal of the binder material from the article.

In one embodiment the fluorothermoplasts used in the blends are PFAs. PFAs are copolymers of TFE and at least one perfluoro alkyl vinyl ethers (PAVE's), perfluoro alkyl allyl ethers (PAAE) and combinations thereof. Typical amounts of copolymers range from 1.7% to 10% wt. Preferably, the PFAs have a melting point between 280° C. and 315° C., for example between 280° C. and 300° C.

The fluorothermoplasts may be linear or branched, for example in case they contain HFP, or they may contain longer branches created by using branching modifiers in the polymerization as described, for example in WO2008/140914 A1.

Blends of fluoropolymers may be conveniently prepared by providing the polymers in the form of aqueous dispersions and then blending the dispersions. The resulting dispersion may be upconcentrated to remove water if necessary by thermal evaporation, ultrafiltration or other methods known in the art. The other ingredients of the 3D-printable composition may be added to the dispersion containing the fluoropolymer blends to provide the final 3D-printable composition.

Reactive Material

Polymerizable Binder

The reactive material of the 3D-printable composition comprises a polymerizable binder material. The polymerizable binder material is matched to the energy source of the 3D printer, or in case a polymerization initiator is used to the polymerization initiator, or both. The polymerization initiator may be activated by the energy source and in turn initiates the polymerization of the polymerizable binder material. The polymerizable binder material is matched to the energy source of the additive processing device (3D printer) or polymerization initiator, such that exposure of the 3D printable composition to the energy emitted from the energy source allows polymerization to proceed at appropriate speed in the part of the composition that has been exposed to the energy emitted from the energy source of the 3D printer. For example, if the energy source is UV light, the polymerizable binder has reactive groups that are actuated by irradiation with UV-light to start the polymerization. Alternatively or additionally, the composition may contain a photoinitiator that is reactive to UV irradiation and the activated photoinitiator then activates the reactive groups in the polymerizable binder to set off the polymerization.

The structure and nature of the polymerizable binder material is not particularly limited unless the desired result cannot be achieved. Upon polymerization the polymerizable binder forms a network with the dispersed fluoropolymer particles resulting in solidified or gelled composition with the fluoropolymer particles contained in the polymerized binder network. This composition already has the three-dimensional shape of the final article but may contain liquid, for example water, and is referred to as "green body". The optimum amount and type of polymerizable binder material may be determined taking into account the following: the amount of binder material preferably is high enough such that it allows to solidify in the areas where the layers are to be created, i.e. it is preferably present in an effective amount to allow the formation of solidified layers of the desired dimensions. Secondly, the amount of polymerized binder may be minimised with respect to the fluoropolymer content to minimise or avoid shrinking of the article during the working up process. Also the formation of voids in the finished articles created during the removal of the polymerized binder material may be minimised or even avoided. Also the stability of the fluoropolymer dispersion has to be considered and too high amounts of binder material may lead to premature coagulation of the fluoropolymer dispersion or solution. The binder material is capable to polymerize to form a solid or gel of sufficient strength to retain dimensional stability throughout the creation of the created object. However, the polymerized binder material should not be responsible for the dimensional stability of the finished article and can be removed thermally during the work up procedure without the article becoming dimensionally unstable. The polymerizable binder material desirably polymerizes fast under the conditions in the additive processing machine.

Further, the polymerized binder thermally degrades at temperature below the melting structure of the fluoropolymer, preferably it can be combusted at such conditions.

Preferably, the polymerizable binder material is dissolved or dispersed in the 3D printable composition. In one embodiment, the polymerizable binder material is liquid. To dissolve or disperse the binder material organic solvents or dispersants may be used or an aqueous medium like water may be used. The organic solvents or dispersants are preferably inert and do not polymerize or react with the binder or polymerization initiator.

A suitable polymerizable binder material includes monomers, oligomers or polymers with polymerizable groups, preferably end groups, that preferably are liquid or that can be dispersed or dissolved in a liquid, for example water. The polymerizable end groups include groups reactive to electromagnetic irradiation by polymerization or that polymerize upon activation by polymerization initiators or a combination thereof.

Suitable polymerizable binder materials include compounds with polymerizable groups comprising one or more olefinic unsaturation. Examples include compounds with end or side groups comprising one or more ethylenic unit, ie. a carbon-carbon unsaturation. Examples include end groups comprising one or more of the groups selected from vinyl groups (e.g., $H_2C=CX-$ groups), allyl groups (e.g., $H_2C=CX^2-CX^3X^4-$), vinyl ether groups (e.g., $H_2C=CX-O-$), allyl ether groups e.g., ($H_2C=CX^2-CX^3X^4-O-$), and acrylate groups (e.g., $H_2C=CX-CO_2-$) and combinations thereof. $X^2$ represents H, methyl, halogen (F, Cl, Br, I) or nitrile and $X^3$ and $X^4$ each independently represents H, methyl, halogen (F, Cl, Br, I) or nitrile. In one embodiment one of $X^3$ or $X^4$ is methyl and one is H and also $X^2$ is H. In a preferred embodiment $X^2$, $X^3$ and $X^4$ are all H. X represents H or $CH_3$. Examples include but are not limited to ethylene groups, vinyl groups, allyl groups. Suitable polymerizable groups include but are not limited to end and side groups comprising one or more units corresponding to the general formula (I)-(VI):

$$H_2C=C(X)- \qquad (I)$$

$$H_2C=C(X)-O- \qquad (II)$$

$$H_2C=C(X)-CH_2-O- \qquad (III)$$

$$H2C=C(X)-C(=O)- \qquad (IV)$$

$$H_2C=CX-CO_2- \qquad (V)$$

$$H_2C=C(X)-OC(O)- \qquad (VI)$$

Examples of polymerizable binder materials include mono acrylates and mono methacrylates, i.e. compounds with one end or side group comprising an acrylate group or methacrylate group (e.g. an $H_2C=CX-CO_2-$ group where X is H or $CH_3$). Another example includes polyacrylates or poly methyl acrylates, i.e. compounds having more than one end and/or side groups comprising an acrylate or methacrylate group. Yet other examples include monomeric, oligomeric and polymeric acrylates. Oligomeric acrylates comprise from 1 up to 25 repeating monomeric units. Polymeric acrylates comprise more than 25 repeating units. Further, these compounds comprise at least one acrylate end or side group to qualify as polymerizable acrylates. Examples of repeating units of such monomeric, oligomeric or polymeric acrylates include but are not limited to ethoxy ($-CH_2CH_2O-$) units and propoxy ($-C_3H_6O-$) units as well as acrylate units and combinations thereof. Acrylates comprising an ethoxy unit are referred to also as "ethoxylated acrylates".

Specific examples include ethoxylated or polyethoxylated acrylates, for example polyethylene glycols having one, two or three acrylic end or side groups. Other examples include acrylates having one or more than one acrylate group linked to an alkyl or alkylene chain that may be interrupted once or more than once by oxygen atoms. Acrylates include but are not limited to monoacrylates, diacrylates and triacrylates and combinations thereof including their methacrylic equivalents. Specific examples include but are not limited to exthoxylated triacrylates and diacrylates and the corresponding methacrylates. Specific examples include ethoxylated trimethylol propane triacrylates (SR415); polyethylene glycol dimethacrylate (SR252), polyethylene glycol diacrylate (SR344), ethoxylated bisphenyl A dimethacrylate (SR9036A), ethoxylated bisphenyl A dimethacrylate (SR9038) all commercially available from Sartomer Americas, Exton, Pa., USA.

In one embodiment of the present disclosure the binder material comprises a polyethylene glycol di- or triacrylate or a combination of polylethlyene glycol di- and triacrylates.

The overall composition of the polymerizable material may be selected so that the polymerized material is liquid, or is soluble in a solvent or dispersing medium used in the 3D-printable composition, e.g. water. Further, the overall composition of the polymerizable material can be selected to adjust compatibility with the other ingredients of the 3D-printable composition or to adjust the strength, flexibility, and uniformity of the polymerized material. Still further, the overall composition of the polymerizable material can be selected to adjust the burnout characteristics of the polymerized material prior to sintering. Various combinations of binder materials may be possible and are available to the person skilled in the art. Mixtures of different polymerizable binder materials may be used. For example bi- or polyfunctional polymerizable binder materials may be included that generate a cross-linked network. A successful build typically requires a certain level of green body gel strength as well as shape resolution. A crosslinked approach often times allows for greater green body gel strength to be realized at a lower energy dose since the polymerization creates a stronger network. The presence of monomers having a plurality of polymerizable groups tends to enhance the strength of the gel composition formed when the printing sol is polymerized. The amount of the monomer with a plurality of the polymerizable groups can be used to adjust the flexibility and the strength of the green body, and indirectly optimize the green body resolution and final article resolution.

In the following, exemplary binder materials are contemplated as being useful as an alternative to the materials described above or in combination with them.

Examples include but are not limited to acrylic acid, methacrylic acid, beta-carboxyethyl acrylate, and mono-2-(methacryloxyethyl)succinate. Exemplary polymerization hydroxyl-containing monomers for use as binder or for preparing binder compositions include hydroxyethyl acrylate, hydroxyethyl methacrylate, hydroxy propyl acrylate, hydroxypropyl methacrylate, hydroxyl butyl acrylate, and hydroxybutyl methacrylate. Acryloxy and methacryloxy functional polyethylene oxide, and polypropylene oxide may also be used as the polymerizable hydroxyl-containing monomers.

An exemplary radically polymerizable binder material comprises mono-(methacryloxypolyethyleneglycol) succinate.

Another example of a radically polymerizable binder material (activated by a photoinitiator) is a polymerizable silane. Exemplary polymerizable silanes include methacryloxyalkyltrialkoxysilanes, or acryloxyalkyltrialkoxysilanes (e.g., 3-methacryloxypropyltrimethoxysilane, 3-acryloxypropyltrimethoxysilane, and 3-(methacryloxy)propyltriethoxysilane; as 3-(methacryloxy)propylmethyldimethoxysilane, and 3-(acryloxypropyl)methyldimethoxysilane); methacryloxyalkyldialkylalkoxysilanes or acyrloxyalkyldialkylalkoxysilanes (e.g., 3-(methacryloxy)propyldimethylethoxysilane); mercaptoalkyltrialkoxylsilanes (e.g., 3-mercaptopropyltrimethoxysilane); aryltrialkoxysilanes (e.g., styrylethyltrimethoxysilane); vinylsilanes (e.g., vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, and vinyltris(2-methoxyethoxy)silane).

Exemplary monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylte, butylene glycol diacrylate, bisphenol A diacrylate, diethylene glycol diacrylate, triethylene glycol diacrylate, tetraethylene glycol diacrylate, tripropylene glycol diacryalte, polyethylene glycol diacrylate, polypropylene glycol diacrylate, polyethylene/propylene copolymer diacrylate, polybutadiene di(meth)acrylate, propoxylated glycerin tri(meth)acrylate, and neopentylglycol hydroxypivalate diacrylate modified caprolactone.

Exemplary monomers with three or four (meth)acryloyl groups include, but are not limited to, trimethylolpropane triacrylate (e.g., commercially available under the trade designation TMPTA-N from Cytec Industries, Inc. (Smyrna, Ga., USA) and under the trade designation SR-351 from Sartomer (Exton, Pa., USA)), pentaerythritol triacrylate (e.g., commercially available under the trade designation SR-444 from Sartomer), ethoxylated (3) trimethylolpropane triacrylate (e.g., commercially available under the trade designation SR-454 from Sartomer), ethoxylated (4) pentaerythritol tetraacrylate (e.g., commercially available under the trade designation SR-494 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available front Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), and di-trimethylolpropane tetraacrylate (e.g., commercially available under the trade designation SR-355 from Sartomer).

Exemplary monomers with five or six (meth)acryloyl groups include, but are not limited to, dipentaerythritol pentaacrylate (e.g., commercially available under the trade designation SR-399 from Sartomer) and a hexa-functional urethane acrylate (e.g., commercially available under the trade designation CN975 from Sartomer).

Exemplary monomers for use as polymerizable binders include alkyl (meth)acrylates that have an alkyl group with a linear, branched, or cyclic structure. Examples of suitable alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, 3,3,5-trimethylcyclohexl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate.

Optimum amounts of binder material may be adapted to the specific system used. Generally, suitable amounts of polymerizable binder are from 1 to 50%, or from 2 to 25%, or from 10 to 20% (weight per cents based on the total weight of the compositions) The polymerized binder may have to be removed during the work-up procedure so the binder material should not be used in a great excess over the fluoropolymer particles as this may cause a structural failure of the article. Optimum ratios of fluoropolymer to polymerizable binder material depend on the type and nature of the binder material but may typically include, but are not limited to, weight ratios of fluoropolymer to polymerizable binder material of from 5:1 to 1:2, preferably from 4:1 to 1:1.

In some applications, it can be advantageous to minimize the weight ratio of polymerizable binder material to fluoropolymer particles in the reaction mixture. This tends to reduce the amount of decomposition products of organic material that needs to be burned out prior to formation of the sintered article. The amount of binder may also depend on the speed at which the fluoropolymer particles sinter. If the sintering proceeds fast the combustion gases from the binder material get trapped inside the article, which can lead to a reduced density or to surface defects. In this case oxidation catalysts may be used or the amount binder may be reduced.

Preferably, the polymerizable binder material has a weight of from 100 to 5,000 g/mole or comprises polymerizable monomers or oligomers having a molecular weight from 100 to 5,000 g/mole. This facilitates the formation of a 3D-printable composition of a favourably low viscosity. Also lower molecular weight polymerizable binder material may be better soluble in an aqueous dispersion than high molecular weight material.

Other exemplary polymerizable binder materials contemplated herein include materials with polymerizable groups including but not limited to epoxides, silanes and reactive components that can polymerize to form polyurethanes (e.g hydroxyl groups, ester groups, isocyanate groups.

Other Additives

Polymerization Initiators

One or more polymerization initiators that initiate polymerization of the polymerizable binder material may be present in the 3D-printable composition. The polymerization initiator gets activated upon exposure to the energy source, for example, upon exposure to UV irradiation or e-beam irradiation, or heat. Initiators that are actuated by irradiation with visible or invisible light are referred to as photoinitiators. Polymerization initiators may be organic or inorganic. Polymerization Initiators are known in the art and are commercially available. Preferably, the following classes of photoinitiator(s) can be used: a) two-component system where a radical is generated through abstraction of a hydrogen atom form a donor compound; b) one component system where two radicals are generated by cleavage.

Examples of photoinitiators according to type (a) typically contain a moiety selected from benzophenone, xanthone or quinone in combination with an aliphatic amine.

Examples of photoinitiators according to type (b) typically contain a moiety selected from benzoin ether, acetophenon, benzoyl oxime or acyl phosphine.

Exemplary UV initiator include 1-hydroxycyclohexyl benzophenone (available, for example, under the trade designation "IRGACURE 184" from Ciba Specialty Chemicals Corp., Tarrytown, N.Y.), 4-(2-hydroxyethoxy)phenyl-(2-hydroxy-2-propyl) ketone (available, for example, under the trade designation "IRGACURE 2529" from Ciba specialty Chemicals Corp.), 2-hydroxy-2-methylpropiophenone (available, for example, under the trade designation "DAROCURE D111" from Ciba Specialty Chemicals Corp. and bis(2,4,6-trimethylbenzoyl)-phenylposphineoxide (available, for example, under the trade designation "IRGACURE 819" from Ciba Specialty Chemicals Corp.).

In one embodiment of the present disclosure a polymerization initiator is used with a polymerizable binder material selected from acrylates. Typically the polymerization initiator is a photoinitiator, which is activated by irradiation with visible or invisible light, preferably by UV irradiation. The optimum amounts of initiator depend on the system used. Typical amounts include but are not limited to amounts of 1 to 0.005 times the weight of the polymerizable binder used.

The photoinitiator should be able to start or initiate the polymerization of the polymerizable binder material. Typical amounts of photoinitiator(s) include but are not limited to the following amounts: Lower amount at least 0.01 or at least 0.1 or at least 0.5 wt. %; Upper amount: at most 0.5 or at most 1.5 or at most 3 wt.-%; Range: from 0.01 to 3 or from 0.5 to 1.5 wt.-% wt.-% with respect to the weight of the 3D-printable composition.

Instead of polymerization initiators that are activated by visible or invisible light, like UV irradiation, it is also possible to use initators that are activated thermally or by actinic irradiation. In such case, the energy source is appropriately selected to allow activation of the initiators.

Polymerization Inhibitors

The 3D-printable compositions may also contain one or more polymerization inhibitors, to help keeping the polymerization reaction localized to the areas that have been exposed to the energy source of the additive processing machine. Such polymerization inhibitors slow down the polymerization reaction or terminate it, for example by acting as radical scavengers. Inhibitors for polymerization with irradiation through light, including UV light are known in the art "photoinitiators" and include commercially available materials such as 2,6-di-tert-butyl-4-methylphenol, available from Sigma-Aldrich, St. Louis, Mo., USA. Optimum amounts of inhibitors depend on the system of polymerizable binder material, initiators and energy source used. Typical amounts of inhibitors include but are not limited to amounts of from 0.9 to 0.001 times the amount of polymerization initiator (by weight).

Fillers, Pigments, UV Enhancers and Oxidation Catalysts

The 3D-printable compositions may further comprise fillers, pigments or dyes if compatible with the 3D printer used and the thermal work up treatment. Fillers may include but are not limited to silicon carbide, boron nitride, molybdenum sulfide, aluminum oxides, carbon particles, such as graphite or carbon black, carbon fibers, carbon nanotubes. The filler content can be optimized to the system used and may typically be between 0.01 to 10% or up to 30% or even up to 50% by weight based on the total weight of the composition depending on the fluoropolymer and binder materials used. The fillers should be in particulate form and have sufficiently small particle size to allow for a homogeneous dispersion in the 3D-printable composition. To be compatible with the 3D-printable composition the filler particles advantageously have a particle size of less than 500 µm, preferably less than 50 µm or even less than 5 µm.

Pigments have to be heat-stable at the temperatures applied in the thermal work up procedures, i.e. at least the melting temperature of the non-melt processable fluoropolymer.

Ingredients that increase the irradiation energy from the energy may also be included in the 3D printable composition. For example, by activation through UV irradiation UV enhancers ("optical brighteners") may be included in the composition. These are chemical compounds that absorb light in the ultraviolet and violet region (usually 340-370 nm) of the, and re-emit light in the blue region (typically 420-470 nm) by fluorescence. A useful optical brightener is Benetex OB-M1. Lakefield ct. Suwanee, Ga. 30024. This UV brighteners may also help to limit the penetration of the irradiation from the energy source through the 3D-printable composition and to control the polymerization to localized areas.

Oxidation catalysts may also be included in the 3D-printable composition to accelerate the combustion of binder during the thermal work up procedure. This may help to create a smoother surface and to avoid the formation of surface defects. It is believed that when the combustion of the binder material is not completed when the surface particles fuse during a sintering step trapped combustion gases may lead to formation of microbubbles or micro cracks on the surface of the sintered article. The oxidation catalyst may accelerate the combustion such that the combustion gases have evaporated before the fluoropolymer particles on the surface fuse. Oxidation catalysts are described for example in U.S. Pat. No. 4,120,608 and include cerium oxides or other metal oxides. Cerium oxide is commercially available from Nyacol Nano Technologies Inc. This might reduce scattering effects from the US source.

Additive Processing of the 3D-Printable Composition

The 3D printable composition preferably is a solution or a dispersion containing the fluoropolymer particles. The particles may be dispersed in an inert organic solvent or in water or in the polymerizable binder material or a combination thereof. Preferably the fluoropolymer particles are dispersed in an aqueous medium and the 3D printable composition comprises an aqueous dispersion of fluoropolymer particles. The fluoropolymer content of the compositions is preferably as high as possible but may be limited by stability of the dispersion (coagulation or precipitation of fluorpolymers) or the dispersions may convert into pastes and polymerization might proceed too slowly to create solidified layers. Generally, concentrations of non-melt processable fluoropolymers may include but are not limited to concentrations from about 25 to 60%, from about 30 to 50% or from about 31 to 45% wt. based on the total weight of the composition.

The composition is entered into the additive processing machine (3D printer), for example those described for stereolithography or vat polymerization, and is subjected to additive processing to create a three-dimensional object, also referred to as "green body". When an aqueous dispersion is used as 3D-printable composition the green body typically is in the form of an aqua gel and has to be subjected to drying to remove the water. In other compositions not using water as dispersing agent, the dispersing agent will have to be removed from the polymerized (solidified or gelled) structure. The green body is removed from the 3D printer and is separated from the unreacted composition. The unreacted composition may be discarded or reused in another additive processing.

The resulting green body is subjected to drying to remove solvent or dispersion medium if used. The drying should be carried out to ensure that the entirety of the green body dries as uniform as possible. Drying is preferably carried out slowly to avoid the formation of cracks or tilts in the object. Typically, the drying can be carried out at room temperature for 12 or 24 hours, or by using a vacuum oven (for example using temperatures from 30 to 80° C. or 40 to 70° C. and pressures between 760 and 1×10³ Torr). Drying under control led humidity for example under 50 to 90% humidity, may also be carried out. The optimum treatment may dependent on the 3D printable composition used and on size and geometry of the article generated.

The polymerized binder material may be removed from the green body in a separate or parallel heating regime. Conveniently this is carried out by a heat treatment to degrade (for example by oxidization or combustion) and/or evaporate the polymerized material. The temperatures are typically chosen such that the fluoropolymer article does not melt or gets destroyed, although in particular for fluoropolymers with low MFI, and in particular for "non-melt processable" fluoropolymers sintering may be used where heating above the melting point may be carried out. However, preferably, sintering is carried out in a separate subsequent heat treatment. Typically, the article turns black during the combustion step of the heat treatment. In an additional heating step the temperature may be raised to the melting temperature of the non-melt-processable fluoropolymer or above ("sintering"). At such temperatures the fluoropolymer particles will fuse but because of the extremely high melt-viscosity of these polymers, they will retain their shape. Through this sintering step the density of the article can be further increased. In the sintering step the article is subjected to temperatures at or above the melting temperature of the fluoropolymer, in particular the non melt-processable fluoropolymer, but below its degradation temperature. The heat treatment may depend on the melt flow index of the fluoropolymer used. Heat treatment of up to 20° C. up to 40° C. or even up to 60° C. above the melting point of the fluoropolymer, in particular for non-melt processable fluoropolymers may be carried out in the sintering step. The remaining binder material burns off at the sintering step and the article turns white. However, the sintering can be controlled such that the binder material does not completely burn off and residual amounts remain in the article, which may be desired for some applications. The presence of residual degraded binder material may add some properties to the article that may be desirable for particular applications.

The final article typically has the same shape as the green body, although some shrinking compared to the green body may be observed. By doing controls and test runs the amount of shrinking can be taken into account when programming the additive processing machine. Shrinking may be minimised by maximizing the fluoropolymer content of the 3D printable composition. A higher comonomer content in the TFE copolymer, in particular PAVE or PAAE content, may also lead to a reduced shrinking.

The fluoropolymer article obtained after sintering has surprisingly few voids. Without being bound by theory, it is believed that during the sintering step the fluoropolymer particles have fused together thus eliminating voids created by removing the binder. Shaped fluoropolymers can be obtained that have a void content of less than 20% (200%), preferably less than 10% (100%), or less than 2% (20%). For example, shaped fluoropolymers can be provided having a void content between 0.1 and 1.5% (1 and 15%), between 2.2 to 5.5% (22 and 55%), between 6.0 to 12.0% (60 to 120%) or between 12.5 to 18.5% (125 to 185%). In one embodiment the fluoropolymer has a void content (Voi) of from 1% to 55%). It is also believed that the small particle size of the fluoropolymers in the 3D printable compositions is benefitial for creating such dense shaped fluoropolymers as characterized by a low void content.

It is contemplated that shaped fluoropolymers may be obtained that have stretch void index (SVI) at an elongation of 200% or 100% of less than 200, or less than 100 or even less than 9.

Fluoropolymer articles, and in particular PTFE articles, where the fluoropolymer has a density of more than 2.00, for example between 2.05 and 2.11 g/cm³ may be obtained by the processes disclosed herein. In one embodiment the fluoropolymer article has a density of from 2.13 to 2.17 g/cm³. Such densities and void contents may be reached with sintering at ambient pressure (1 bar). Sintering may be carried out at temperatures of 10 to 40° C. or between 30° C. and 60° C. above the melting point of the fluoropolymer but below the degradation temperature of the polymer. The polymer particles fuse (coalesce) under such conditions but the overall structure of the polymer article is maintained because of the high melt viscosity of the polymers. If the temperature is set too high or too long the article may deform. In such case a lower temperature or shorter time period should be used.

Articles

The fluoropolymers described above can be shaped into articles by the methods provided in the present disclosure. The shaped fluoropolymers are articles and are also referred to herein as "fluoropolymer articles". The fluoropolymer articles may also be components of other articles.

The shaped, fluoropolymers may contain one or more fillers or one or more other ingredients. In one embodiment the shaped fluoropolymers comprise from 50 to 100% of the fluoropolymers. In one embodiment the shaped fluoropolymer comprises one or more filler and the amount of fillers may be up to 1%, or up to 10% or even up to 50% by weight based on the weight of the fluoropolymer article.

It is an advantage of the methods and compositions of the present disclosure that not melt-processable fluoropolymers can be shaped into articles having geometries and designs that could not be produced by machining with shaping tools. This includes integral articles comprising an essentially hollow structure. Hollow structures can be prepared by machining but only to some extent. Usually hollow structures are prepared in several steps and separate parts are joined, for example by welding. This leaves a seam (for example a weld seam) or a bond line visible to the naked eye. "Integral articles" as used herein do not have joint parts or an interlace where two or more parts have been joint together. They do not have a seam or a bond line. With the 3D-printable compositions provided herein integral fluoropolymer articles with complex geometries can be prepared. Examples include but are not limited to integral and essentially hollow fluoropolymer articles. "Essentially hollow articles" as used herein are articles that comprise a hollow structure or a hollow component, for example, but not limited to, a hollow sphere, a cylinder, a cube, or a pyramid that has a continuous or an essentially continuous surface. An "essentially continuous surface" as used herein contains one or more apertures penetrating the surface. Preferably, less than 40% or less than 30%, more preferably less than 10% or less than 1% of the surface area of the continuous surface is interrupted by one or more apertures penetrating through the surface into the hollow part. Other structures that are difficult or even impossible to produce by conventional machining include honeycomb structures without weld seams. Further examples include integral articles with one or more undercuts, for example integral articles having one or more opening or aperture but further contain one or more undercuts at the inner side of the opening or aperture or behind the opening or aperture.

Fluoropolymer articles of big and small dimensions can be produced. Only the size of the additive processing device may set a limitation to the size of the articles that can be produced. Articles of small dimensions may also be conveniently produced by the methods described herein. An article comprising a shaped fluoropolymer can be prepared having a longest axis (as the case may be this may also be a diameter) that is smaller than 1.0 cm or even smaller than 0.7 mm. In one embodiment small fluoropolymer articles may be produced having a longest axis or diameter of from about 0.01 to about 1.0 mm, or from 0.7 to 1.5 cm. In another embodiment articles may be produced, for example articles having a smallest axis or diameter of at least 1.1 mm.

The fluoropolymer articles can be produced by the additive processing as described herein having mechanical properties comparable to fluoropolymer articles prepared by conventional machining. For example shaped fluoropolymers, in particular non melt-processable fluoropolymer, can be produced by the method of the present disclosure having a tensile strength of from at least 5 MPa, for example but not limited to from 12 to 24 MPa (DIN EN ISO 12086-2). The shaped, fluoropolymers, in particular shaped non melt-processable fluoropolymers may have an elongation at break of at least 100% for example, but not limited to, an elongation at break of 150 to 400% (DIN EN ISO 12086-2 with a pulling rate of 50 mm/min).

Shaped, fluoropolymers and articles can be produced with the methods and compositions of the present disclosure that have a specific density of more than 2.05 g/cm$^3$ without applying any pressure, i.e. at ambient pressure (1 bar) or even at reduced pressure. As a result the shaped, fluoropolymers are not oriented and are essentially isotropic, at least in two of the three spatial directions). This presents another advantage of the methods and compositions provided herein. Fluoropolymers with a low MFI, for example below 50 g/10 min (MFI 372/5) and in particularly the so-called non melt-processable fluoropolymers have been conveniently shaped so far by subjecting the fluoropolymer to forces under high pressure (and temperatures). As a result the shaped fluoropolymer is oriented (anisotropic) and the shaped fluoropolymer may have different mechanical properties at different spatial coordinates (e.g. different properties in the longitudinal and transverse direction).

With the compositions and methods of the present disclosure shaped fluoropolymers can be prepared that are essentially isotropic. For example, shaped fluoropolymers can be prepared by the 3D-printing methods provided herein, that have a degree of orientation of less than 20%, or even less than 10% or even less than 5% (as determined by polarized light microscopy).

In one embodiment a shaped fluoropolymer may be provided that is essentially isotropic regarding its tensile strength and or elongation at break, which means the fluoropolymer has essentially the same properties in at least two of all three spatial orientations (x-, y-, and z-direction, x being the longitudinal direction, y being the transversal direction and z being perpendicular to the x and y direction), or the properties deviate by less than 50% or less than 20%, preferably less than 10%, more preferably less than 5% and most preferably less than 1%.

Shaped fluoropolymers can be obtained that have good mechanical properties. For example shaped fluoropolymer can be obtained that have a tensile strength of at least 5 MPa and/or an elongation of at least 50%, preferably at least 100%.

The fluoropolymers, in particular non melt-processable fluoropolymers, can be shaped into articles that have at least one element or part of a defined geometrical shape. Defined geometrical shapes include but are not limited to circles, semicircles, ellipses, half-spheres, squares, rectangles, cubes, polygons (including but not limited to triangles hexagons, pentagons, and octagons) and polyhedrons. The shapes may be three-dimensional and include pyramids, cuboids, cubes, cylinders, half-cylinders, spheres, half-spheres). The shapes also include shapes composed of different shapes like diamonds (combination of two triangles). For example, a honeycomb structure contains several hexagons as geometrical elements. In one embodiment the geometrical shape has an axis or diameter of at least 0.5 millimetres, or at least one millimetre or at least 2 millimetres or at least one centimeter.

For the avoidance of doubt the shaped fluoropolymers do not include coatings. Coatings are coatings of any kind and include but are not limited to spray coatings, roto molding, dip coating, bar coating, solvent casting, paste coating.

The shaped fluoropolymers are preferably sintered fluoropolymers, i.e. the not melt-processable fluoropolymers have been subjected to sintering.

The shaped fluoropolymers obtained by the 3D printing methods provided herein also differ from those shaped by conventional methods in that their surface does not show any marks from shaping tools. This can be determined, for example, by optical microscopy or raster electron microscopy.

As another advantage of the methods and compositions provided herein is that shaped fluoropolymers may be prepared that contain fillers and that are essentially isotropic with respect to the distribution of the fillers. Filler of not spherical shape may get oriented when shaping not melt-processable fluoropolymers with conventional shaping methods. With the method provided herein such fillers may not get oriented but may be distributed randomly in the fluoropolymer composition. Examples of such fillers include but are not limited to carbon fibers, glass fibers, ceramic fibers, polyaramide fibers, boron nitride, aluminum oxides and aluminum oxide containing fillers and graphite, carbon and carbon nanotubes. The distribution of fillers can be determined by optical or electronic microscopy of samples.

As another advantage of the methods and compositions provided herein is that shaped fluoropolymers may be prepared that are essentially isotropic with regard to their electronically conductive properties. Such fluoropolymer articles contain one or more electronically conductive filler, including, for example, graphite and carbon nanotubes. Electrical Conductivity and electrical volume resistivity can be measured, for example, in accordance with ASTM F84-98 as published in November 1998.

As another advantage of the methods and compositions provided herein is that shaped fluoropolymers may be prepared that are isotropic with respect to thermal conductivity. Such fluoropolymer articles contain filler that are thermally conductive and include, for example, graphite and boron nitride. Thermal conductivity and thermal resistivity can be determined, for example, according to ASTM E1461-13 (published in October 2013).

In one embodiment of the present disclosure a fluoropolymer article is produced containing a shaped fluoropolymer that is a "green body". In such embodiment, the article comprises from 10 to 50% by weight of a polymerized binder material, for example a binder material obtained by the polymerization of the polymerizable binder material described herein.

In another embodiment of the present disclosure a fluoropolymer article is produced containing a shaped fluoropolymer that is a "green body". In such embodiment, the article comprises from 1 to 25% by weight of a reaction product of a combustion reaction of polymerized binder material, for example a binder material obtained by the polymerization of the polymerizable binder material described herein.

Fluoropolymer articles of different shapes, designs and functions may be obtained. Also articles comprising the fluoropolymer articles of different designs and functions may be obtained. Examples of articles and fluoropolymer articles include but are not limited to bearings, for example friction bearings or piston bearings, gaskets, shaft seals, ring lip seals, washer seals, O-rings, grooved seals, valves and valve seats, connectors, lids and containers. The article may be medical implants, chemical reactors, screws, cogwheels, joints, bolts, pumps, electrodes, heat exchangers, mixers, turbines, electrical transformers, electrical insulators, extruders or the articles may be components of other articles including the above articles. The articles may be used in application where resistance to acids, bases, fuels, hydrocarbons is required, where non-stick properties are required, where heat resistance is required and combinations thereof.

Preferably, the articles of components thereof contain the shaped fluoropolymer wherein the fluoropolymer has been shaped into structures that contain one or more than one channels, perforations, honeycomb structures, essentially hollow structures and combinations thereof. Such structures may be flat, curved or spherical. Preferably, the articles are not tubes or sheets because such materials may be more conveniently prepared by the extrusion processes used for non-melt processable fluoropolymers of the art.

List of Particular Embodiments

The following lists of exemplary embodiment are provided to further illustrate the present disclosure without intending to limit the disclosure to the specific embodiments listed.

List 1

1. An article comprising a shaped fluoropolymer wherein the shaped fluoropolymer is a homopolymer of tetrafluoroethene (TFE) or a copolymer of TFE and up to and including 20% by weight based on the weight of the fluoropolymer of one or more alpha olefins corresponding to the formula $$R^f\text{—}CX^3\text{=}CX^1X^2$$

wherein $X^1$, $X^2$, $X^3$ are either all F or at least one of $X^1$, $X^2$ and $X^3$ is F and the other(s) being Cl, $R^f$ is a linear or branched alkyl radical of 1-12, preferably 1-3, carbon atoms which alkyl chain may be interrupted once or more than once by an oxygen atom and of which all hydrogen atoms have been replaced by fluorine atoms and wherein the fluoropolymer is essentially isotropic and has a void content of less than 20%, preferably less than 10%, or less than 2%.

2. The article of embodiment 1 wherein the fluoropolymer is a copolymer of tetrafluoroethylene and one or more comonomers selected from hexafluoropropene, one or more perfluorinated alpha olefin ethers corresponding to the formula $$R^f\text{—}O\text{—}(CF_2)_n\text{—}CF\text{=}CFR_2,$$

wherein n represents 1, or 0 and $R^f$ represents a linear or branched, cyclic or acyclic perfluorinated alkyl residue containing at least one catenary oxygen atom, and a combination of such comonomers.

3. The article of any one of the preceding embodiments, wherein the fluoropolymer is a homopolymer of TFE or a copolymer of tetrafluoroethylene and up to 1% by weight based on the weight of the fluoropolymer of one or more alpha olefins corresponding to the formula $$R^f\text{—}CX^3\text{=}CX^1X^2$$

wherein $X^1$, $X^2$, $X^3$ are either all f or two of $X^1$, $X^2$ and $X^3$ are F and one being Cl, $R^f$ is a linear or branched alkyl radical of 1-12, preferably 1-3, carbon atoms which alkyl chain may be interrupted once or more than once by an oxygen atom and of which all hydrogen atoms have been replaced by fluorine atoms.

4. The article of any one of the preceding embodiments wherein the fluoropolymer has a void content between 0.1 and 1.5%.
5. The article of any one of the preceding embodiments wherein the fluoropolymer has a void content of between 2.2 to 5.5%.
6. The article of any one of the preceding embodiments wherein the fluoropolymer has a melting point of at least 317° C.
7. The article of any one of the preceding embodiments wherein the fluoropolymer has a melting point in the range of 327° C.+/−10° C.
8. The article of any one of the preceding embodiments wherein the fluoropolymer has a melting point in the range of 330° C.+/−7° C.
9. The article of any one of the preceding embodiments wherein the fluoropolymer has a melt flow index at 372° C. and 5 kg load of 1.0 g/10 minutes or less.
10. The article of any one of the preceding embodiments wherein the shaped fluoropolymer has a tensile strength of at least MPa and wherein tensile strength does not differ or only differ by less than 20% in the x, y and z-direction.
11. The article of any one of the preceding embodiments wherein the shaped fluoropolymer has an elongation at break of at least 100% and wherein the elongation at does not differ or only differ by less than 20% in the x, y and z-direction.
12. The article of any one of the preceding embodiments wherein the fluoropolymer has a gravimetric density of from about 2.13 to 2.23 g/cm$^3$.
13. The article of any one of the preceding embodiments wherein the article has a gravimetric density of from about 2.13 to 2.23 g/cm$^3$.
14. The article of any one of the preceding embodiments wherein the fluoropolymer comprises an electronically conductive filler and wherein the electronical conductivity differs by less than 20% in the x, y and z-direction.
15. The article of any one of the preceding embodiments wherein the fluoropolymer comprises a thermally conductive filler and wherein the thermal conductivity differs by less than 20% in the x, y and z-direction.
16. The article of any one of the preceding embodiments comprising from 30 to 100% of the fluoropolymer and from 0% up to 50% of polymerized binder material and from 0% up to 50% of filler, wherein the percentages are weight percentages based on the total weight of the article which is 100%.
17. The article of any one of the preceding embodiments being selected from the group consisting of bearings, gaskets, seals, valves, valve seats, connectors, lids, containers; medical implants, chemical reactors, screws, cogwheels, joints, bolts, pumps, electrodes, heat exchangers, mixers, turbines, electrical transformers, electrical insulators, switches and extruders.
18. The article of any one of the preceding embodiments being selected from a component of an article selected from the group consisting of bearings, gaskets, seals, valves, valve seats, connectors, lids, containers, medical implants, chemical reactors, screws, cogwheels, joints, bolts, pumps, electrodes, heat exchangers, mixers, turbines, electrical transformers, electrical insulators and extruders.
19. The article of any one of the preceding embodiments wherein the fluoropolymer is shaped to contain one or more channels, one or more undercuts, one or more than one perforations, and combinations thereof.
20. The article of any one of the preceding embodiments being an integral article.
21. The article of any one of the preceding embodiments wherein the fluoropolymer is shaped to comprise structures selected honeycomb structures and essentially hollow structures.
22. The article of any one of the preceding embodiments wherein the fluoropolymer is shaped to structure selected honeycomb structures and essentially hollow structures that or flat, curved or spherical.
23. The article of any one of the preceding embodiments wherein the shaped fluoropolymer is obtained by 3D-printing.
24. The article of any one of the preceding embodiments being obtained by 3D-printing.
25. The article of any one of the preceding embodiments having a longest axis including a diameter of up to 5 cm.
26. The article of any one of the preceding embodiments having a longest axis including a diameter of up to 1 cm.
27. The article of any one of the preceding embodiments obtained by 3D printing.
28. An article comprising a shaped fluoropolymer wherein the article has a longest axis or diameter having a length of up to 1 cm and wherein the fluoropolymer wherein the shaped fluoropolymer is a homopolymer of tetrafluoroethene (TFE) or a copolymer of TFE and up to and including 20% by weight based on the weight of the fluoropolymer of one or more alpha olefins corresponding to the formula $$Rf\text{-}CX^3=CX^1X^2$$

wherein $X^1$, $X^2$, $X^3$ are either all F or at least one of $X^1$, $X^2$ and $X^3$ are F with the rest being Cl, Rf is a linear or branched alkyl radical of 1-12 carbon atoms which alkyl chain may be interrupted once or more than once by an oxygen atom and of which all hydrogen atoms have been replaced by fluorine atoms.

The article of embodiment 28 wherein the fluoropolymer is a copolymer of tetrafluoroethylene and one or more comonomers selected from hexafluoropropene, one or more perfluorinated alpha olefin ethers corresponding to the formula $$R^f\text{—}O\text{—}(CF_2)_n\text{—}CF=CF_2,$$

wherein n represents 1, or 0 and $R^f$ represents a linear or branched, cyclic or acyclic perfluorinated alkyl residue containing at least one catenary oxygen atom, and a combination of such comonomers.

The article of embodiments 28 or 29, wherein the fluoropolymer is a homopolymer of TFE or a copolymer of tetrafluoroethylene and up to 1% by weight based on the weight of the fluoropolymer of one or more alpha olefins corresponding to the formula $$R^f\text{—}CX^3=CX^1X^2$$

wherein $X^1$, $X^2$, $X^3$ are either all F or at least one of $X^1$, $X^2$ and $X^3$ is F and the other one(s) being Cl, $R^f$ is a linear or branched alkyl radical of 1-12, preferably 1-3, carbon atoms which alkyl chain may be interrupted once or more than once by an oxygen atom and of which all hydrogen atoms have been replaced by fluorine atoms.

31. The article of embodiments 28 to 30 wherein the article has a longest axis including a diameter that is smaller than 0.5 cm.

32. The article of embodiments 28 to 31 having a void content of less than 20%, preferably less than 10%, or less than 2%.

33. The article of embodiments 28 to 32 wherein the fluoropolymer is essentially isotropic.

34. The article of embodiments 28 to 33 being selected from the group consisting of bearings, gaskets, seals, valves, valve seats, connectors, lids, containers; medical implants, chemical reactors, screws, cogwheels, joints, bolts, pumps, electrodes, heat exchangers, mixers, turbines, electrical transformers, electrical insulators and extruders.

35. The article of embodiments 28 to 34 being selected from a component of an article wherein the article is selected from the group consisting of bearings, gaskets, seals, valves, valve seats, connectors, lids, containers; medical implants, chemical reactors, screws, cogwheels, joints, bolts, pumps, electrodes, heat exchangers, mixers, turbines, electrical transformers, electrical insulators and extruders.

36. The article of embodiments 28 to 35 wherein the fluoropolymer is shaped to contain one or more channels, one or more undercuts, one or more than one perforations, and combinations thereof.

37. The article of embodiments 28 to 36 being an integral article.

38. The article of embodiments 28 to 37 wherein the fluoropolymer is shaped to comprise structures selected honeycomb structures and essentially hollow structures.

39. The article of embodiments 28 to 38 wherein the fluoropolymer is shaped to contain structures selected honeycomb structures and essentially hollow structures that or flat, curved or spherical.

40. The article of embodiments 28 to 39 wherein the shaped fluoropolymer is obtained by 3D-printing.

41. The article of embodiments 28 to 40 being obtained by 3D-printing.

42. A composition for producing an article by additive processing, said composition comprising fluoropolymer particles and a reactive material comprising a polymerizable binder material capable of polymerizing and forming a network containing the fluoropolymer particles upon exposure of the reactive material to energy from an energy source, wherein the fluoropolymer has a melt flow index at 372° C. and 5 kg load of 1.0 g/10 minutes or less.

43. The composition of embodiment 42 wherein the fluoropolymer has a melt flow index at 372° C. and 5 kg load of 0.1 g/10 minutes or less.

44. The composition of any one of the preceding embodiments 42 and 43 wherein the fluoropolymer has a melting point of at least 300° C., preferably in the range of 372° C.+/−10° C.

45. The composition of any one of the preceding embodiments 42 to 44 wherein the fluoropolymer has an SSG density of from about 2.13 to 2.23 g/cm$^3$.

46. The composition of any one of the preceding embodiments 42 to 45 wherein the fluoropolymer is a copolymer of tetrafluorothylene and one or more comonomers selected perfluorinated alpha olefins or alpha olefin ethers and wherein the content of the comonomers is o 20% by weight based on the weight of the copolymer or less.

47. The composition of any one of the preceding embodiments 42 to 46 wherein the fluoropolymer is a copolymer of tetrafluoroethylene and one or more comonomers selected front perfluorinated alpha olefins corresponding to the formula

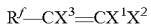

$R^f$—$CX^3$=$CX^1X^2$ wherein $X^1$, $X^2$, $X^3$ are either all F or two of $X^1$, $X^2$ and $X^3$ are F and one is Cl, $R^f$ is a linear or branched alkyl radical of 1-3 carbon atoms of which all hydrogen atoms have been replaced by fluorine atoms, and wherein the content of the comonomers is 20% by weight based on the weight of the copolymer or less.

48. The composition of any one of the preceding embodiments 42 to 47 wherein the fluoropolymer is a copolymer of tetrafluoroethylene and one or more comonomers selected from perfluorinated alpha olefin ethers corresponding to the formula

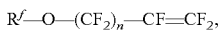

$R^f$—O—$(CF_2)_n$—CF=$CF_2$, wherein n represents 1, or 0 and $R^f$ represents a linear or branched, cyclic or acyclic perfluorinated alkyl residue containing at least one catenary oxygen atom, and wherein the content of the comonomers is 3% by weight based on the weight of the copolymer or less.

49. The composition of any one of the preceding embodiments 42 to 48 wherein the fluoropolymer is a copolymer of tetrafluoroethylene and one or more comonomers selected from perfluorinated alpha olefin ethers corresponding to the formula

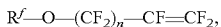

$R^f$—O—$(CF_2)_n$—CF=$CF_2$, wherein n represents 1, or 0 and $R^f$ represents a linear or branched, cyclic or acyclic perfluorinated alkyl residue containing at least one catenary oxygen atom, and wherein the content of the comonomers is 1% by weight based on the weight of the copolymer or less.

50. The composition of any one of the preceding embodiments 42 to 49 wherein the fluoropolymer particles have an average particle size ($D_{50}$) of from 50 to 500 nm.

51. The composition of any one of the preceding embodiments 42 to 50 being a dispersion and the fluoropolymer particles being dispersed.

52. The composition of any one of the preceding embodiments 42 to 51 being a dispersion and the fluoropolymer particles being dispersed in the polymerizable binder material.

53. The composition of any one of the preceding embodiments 42 to 52 being an aqueous dispersion.

54. The composition of any one of the preceding embodiments 42 to 53 wherein the reactive material comprises one or more polymerization initiators capable of initiating the polymerization of the polymerizable binder material.

55. The composition of any one of the preceding embodiments 42 to 54 wherein the reactive material comprises one or more polymerization initiators capable of initiating the polymerization of the polymerizable binder material that are reactive to irradiation by UV light.

56. The composition of any one of the preceding embodiments 42 to 55 wherein the polymerizable binder material comprises polymerizable unsaturated bonds.

57. The composition of any one of the preceding embodiments 42 to 56 wherein the polymerizable binder material comprises polymerizable acrylate and methacrylate groups and combinations thereof.

58. The composition of any one of the preceding embodiments 42 to 57 wherein the polymerizable binder material comprises polymerizable acrylates and methacrylates selected from diacrylates, dimethacrylates, triacrylates, trimethacrylates, acrylates having four or more acrylate groups, methacrylates having four or more methacrylate groups and combinations thereof.

59. The composition of any one of the preceding embodiments 42 to 58 wherein the polymerizable binder material has a molecular weight of less than 5,000 g/mole.

60. The composition of any one of the preceding embodiments 42 to 59 wherein the polymerizable binder material is soluble or dispersable in water.

61. The composition of any one of the preceding embodiments 42 to 60 further comprising one or more non-ionic emulsifiers.

62. The composition of any one of the preceding embodiments 42 to 61 further comprising one or more non-ionic emulsifiers selected from ethoxylated alcohols, ethoxylated amines, amine oxides and a combination thereof.

63. The composition of any one of the preceding embodiments 42 to 62 further comprising one or more oxidation catalysts.

64. The composition of any one of the preceding embodiments 42 to 63 further comprising one or more polymerization inhibitors.

65. The composition of any one of the preceding embodiments 42 to 64 comprising from 5 to 50% by weight of polymerizable binder material, from 10 to 60% by weight of fluoropolymer particles and from 0 to 75% by weight of water, where the amounts are selected to give a total amount of ingredients of 100% (all percentages are weight percentages based on the total weight of the shaped fluoropolymer).

66. The composition of any one of the preceding embodiments 42 to 65 comprising fluoropolymer particles and polymerizable binder material in a weight ratio of from 5:1 to 1:5, preferably from 4:1 to 1:1.

67. The composition any one of the preceding embodiments 42 to 66 further comprising a thermoplastic fluoropolymer with a melting point between 260 and 315° C. and a melt flow index of greater than 1.0 g/10 min (MFI (372° C./5 kg)) and preferably from 1.1 to 50 g/10 min and wherein the weight ratio of thermoplastic polymer to not melt-processable fluoropolymer is from 1:1 to 1:1000.

68. A method of producing an article according to embodiments 1 to 28 by additive processing comprising
  (i) providing a composition comprising fluoropolymer particles and a reactive material comprising a polymerizable binder material capable of polymerizing and forming a network containing the fluoropolymer particles upon exposure of the reactive material to energy from an energy source, wherein the fluoropolymer has a melt flow index at 372° C. and 5 kg load of 1.0 g/10 minutes or less.
  (ii) directing energy from the energy source to a selected location of the composition and causing the polymerizable binder to polymerize in the selected location;
  (iii) repeating steps (i) and (ii) to form multiple layers and create an article.

69. The method of embodiment 68 wherein the energy is UV irradiation from a UV light source.

70. The method of any one of the preceding embodiments 68 or 69 further comprising removing the polymerized binder material.

71. The method of any one of the preceding embodiments 68 to 70 further comprising removing the polymerized binder material by heat treatment or by solvent extraction.

72. The method of any one of the preceding embodiments 68 to 71 further comprising subjecting the article to sintering.

Another list of illustrative embodiments (list 2) includes the following exemplary embodiments, which are also not meant to limit the disclosure to the embodiment exemplified:

List 2

1. Method of producing a fluoropolymer article comprising subjecting a composition comprising fluoropolymer particles to additive processing in an additive processing device containing at least one energy source.

2. The method of embodiment 1 wherein the composition comprises at least one binder material capable of binding the fluoropolymer particles to form a layer in a part of the composition that has been exposed to the energy source of the additive processing device and the method comprises subjecting a part of the composition to exposure of the energy source to form a layer.

3. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer.

4. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the energy source is selected from electromagnetic irradiation.

5. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the energy source is electromagnetic irradiation having single or multiple wavelengths between 10 nm and 1000 nm.

6. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the energy source comprises UV irradiation.
7. The method of any one of the preceding embodiments wherein the composition comprises at least one binder material capable of binding the fluoropolymer particles to form a layer in a part of the composition that has been exposed to the energy source of the additive processing device and wherein the binder material is polymerizable and solidifies through polymerization upon exposure of the composition to the energy source of the additive processing device and wherein the method comprises subjecting a part of the composition to exposure of the energy source to form a layer and wherein the composition further comprises at least one polymerization initiator that is initiated by exposure to the energy source of the additive processing device.
8. The method of any one of the preceding embodiments wherein the binder material comprises polymerizable unsaturated bonds.
9. The method of any one of the preceding embodiments wherein the binder material comprises polymerizable groups selected from acrylates and methacrylates.
10. The method of any one of the preceding embodiments wherein the binder material comprises polymerizable acrylates and methacrylates selected from diacrylate, dimethacrylates, triacrylates, trimethacrylates, acrylates having four or more acrylate groups, methacrylates having four or more methacrylate groups and combinations thereof.
11. The method of any one of the preceding embodiments wherein the composition comprises an aqueous dispersion of fluoropolymer particles.
12. The method of any one of the preceding embodiments wherein the composition comprises fluoropolymer particles having a diameter from about 50 to 500 nm.
13. The method of any one of the preceding embodiments wherein the composition comprises fluoropolymer particles having an average particle size (Z-average) of from about 50 to about 500 nm.
14. The method of any one of the preceding embodiments wherein the composition comprises at least one binder material capable of binding fluoropolymer particles to form a layer in a part of the composition that has been exposed to the energy source by melting upon exposure of the composition to the energy source of the additive processing device, and wherein the method comprises subjecting a part of the composition to exposure of the energy source to form a layer.
15. The method of any one of the preceding embodiments wherein the fluoropolymer is non-melt processable fluoropolymer.
16. The method of any one of the preceding embodiments further comprising at least one heat treatment to remove the binder material.
17. The method of any one of the preceding embodiments wherein the composition comprises at least one binder material capable of binding fluoropolymer particles to form a layer in an area exposed to the energy source of the additive processing device and wherein the method further comprises subjecting the article to a heat treatment to remove binder material by evaporation.
18. The method of any one of the preceding embodiments wherein the composition comprises at least one binder material capable of binding fluoropolymer particles to form a layer in an area exposed to the energy source of the additive processing device and wherein the method comprises subjecting the article to a heat treatment to remove binder by thermal degradation.
19. Fluoropolymer article obtained by additive processing, for example by any one of the methods of embodiments 1 to 18.
20. The article of embodiment 19 comprising from 0.1 to 30% by weight of one or more filler.
21. The article of any one of the preceding embodiments 19 or 20 wherein the fluoropolymer is a non melt-processable fluoropolymer.
22. The article of any one of the preceding embodiments 19 or 21 wherein the fluoropolymer is a non melt-processable fluoropolymer having an SSG density of from about 2.13 to 2.23 g/cm$^3$.
23. An article comprising a component, wherein the component is a fluoropolymer article obtained by additive processing.
24. The article of embodiment 23 wherein the fluoropolymer article is by additive processing according to any one of embodiments 1 to 18.
25. 3D-printable fluoropolymer composition for 3D printing with irradiation as energy source, the composition comprising fluoropolymer particles, a polymerizable binder material wherein the polymerizable binder material solidifies upon exposure of the composition to the energy source.
26. The 3D printable composition of embodiment 25, wherein the composition comprises a dispersion of fluoropolymer particles.
27. The 3D printable composition of embodiments 25 or 26 wherein the composition further comprises a polymerization initiator that initiates polymerization upon exposure to the energy source.
28. The 3D printable composition of embodiment 25 to 27, wherein the composition is liquid composition, for example a liquid dispersion.

Another list of illustrative embodiments (list 3) includes the following exemplary embodiments, which are also not meant to limit the disclosure to the embodiment exemplified:

List 3

1. Method of producing a fluoropolymer article comprising subjecting a composition comprising fluoropolymer particles to additive processing in an additive processing device containing at least one energy source wherein the composition comprises at least one binder material capable of binding the fluoropolymer particles to form a layer in a part of the composition that has been exposed to the energy source of the additive processing device and the method comprises subjecting a part of the composition to exposure of the energy source to form a layer and wherein the binder material is polymerizable and solidifies through polymerization upon exposure of the composition to the energy source of the additive processing device.
2. The method of embodiment 1 wherein the energy source is selected from electromagnetic irradiation.
3. The method of any one of embodiment 1 or 2 wherein the composition comprises fluoropolymer particles having an average particle size from about 50 to 500 nm (Z-average).

4. The method of any one of embodiments 1 to 3 wherein the composition comprises an aqueous dispersion of fluoropolymer particles.
5. The method of any one of embodiments 1 to 4 wherein the composition is an extendable paste.
6. The method of any one of embodiments 1 to 5 wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomors, partially fluorinated comonomers and non-fluorinated comonomers.
7. The method of any one of embodiments 1 to 6 wherein the fluoropolymer has a melt flow index at 372° C. and 5 kg load (MFI 372/5) of less than 1 g/10 min.
8. The method of any one of embodiments 1 to 7 wherein the fluoropolymer has a melt flow index at 372° C. and 5 kg load (MFI 372/5) of less than 0.1 g/10 min.
9. The method of any one of embodiments 1 to 8 wherein the fluoropolymer has a melt flow index at 372° C. and 5 kg load (MFI 372/5) of from 1 to 50 g/10 min.
10. The method of any one of embodiments 1 to 9 wherein the fluoropolymer is a tetrafluoroethene copolymer containing more than 1% by weight and up to 30% by weight based on the weight of the polymer of perfluorinated comonomors, partially fluorinated comonomers and non-fluorinated comonomers and wherein the fluoropolymer has a melting point between 260° C. and 315° C.
11. The method of any one of embodiments 1 to 10 wherein the binder material comprises polymerizable unsaturated bonds.
12. The method of any one of embodiments 1 to 11 wherein the binder material comprises polymerizable groups selected from acrylates and methacrylates.
13. The method of any one of embodiments 1 to 12 wherein the binder material has a molecular weight of less than 5,000 g/mole.
14. The method of any one of embodiments 1 to 13 wherein the composition further comprises other ingredients.
15. The method any one of embodiments 1 to 14 further comprising at least one heat treatment to remove the binder material, preferably including sintering of the fluoropolymer.
16. The method of any one of embodiments 1 to 15 comprising the steps:
    (i) providing the composition containing the fluoropolymer particles and the binder material and optionally other ingredients;
    (ii) causing the binder material to polymerize and solidify to bind fluoropolymer particles by either (a); directing energy from the energy source of the additive manufacturing device to a selected location of the 3D printable composition and causing the binder material to polymerize and solidify to bind fluoropolymer particles; or (b: directing a selected location of the 3D printable composition to the energy source and causing the binder material to polymerize and solidify to bind fluoropolymer particles, or a combination of (a) and (b);
    (iii) directing either (c) the energy source away from the 3D printable composition or (d) directing the 3D printable composition away from the energy source or both, to avoid the binder material polymerizing in the non-selected locations, or a combination of (c) and (d);
    (iv) repeating steps (ii) and (iii), and if necessary also step (i), to form multiple layers and create an article.
17. A composition for producing an article by additive processing, said composition comprising fluoropolymer particles and comprising a polymerizable binder material capable of binding fluoropolymer particles by polymerizing and solidifying to bind fluoropolymer particles upon exposure of the composition to energy from an energy source of an additive processing device.
18. The composition of embodiment 17 wherein the composition comprises an aqueous dispersion of fluoropolymer particles.
19. The composition of any one of embodiment 17 or 18 wherein the composition comprises fluoropolymer particles having an average particle size from about 50 to 500 nm (Z-average).
20. The composition of any one of embodiment 17 to 19 wherein the composition is an extendable paste.
21. The composition of any one of embodiment 17 to 20 wherein the energy source is electromagnetic irradiation.
22. The composition of any one of embodiment 17 to 21 wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomors, partially fluorinated comonomers and non-fluorinated comonomers.
23. The composition of any one embodiment 17 to 22 wherein the fluoropolymer has a melt flow index at 372° C. and 5 kg load (MFI 372/5) of less than 1 g/10 min.
24. The composition of any one of embodiment 17 to 22 wherein the fluoropolymer has a melt flow index at 372° C. and 5 kg load (MFI 372/5) of less than 0.1 g/10 min.
25. The composition of any one of embodiment 17 to 22 wherein the fluoropolymer has a melt flow index at 372° C. and 5 kg load (MFI 372/5) of from 1 to 50 g/10 min.
26. The composition of any one of embodiment 17 to 25 wherein the fluoropolymer is a tetrafluoroethene copolymer containing more than 1% by weight and up to 30% by weight based on the weight of the polymer of perfluorinated comonomors, partially fluorinated comonomers and non-fluorinated comonomers and wherein the fluoropolymer has a melting point between 260° C. and 315° C.
27. The composition of any one of embodiment 17 to 26 wherein the binder material comprises polymerizable unsaturated bonds.
28. The composition of any one of embodiment 17 to 27 wherein the binder material comprises polymerizable groups selected from acrylates and methacrylates.
29. The composition of any one of embodiment 17 to 28 wherein the binder material has a molecular weight of less than 5,000 g/mole.
30. The composition of any one of embodiment 17 to 29 further comprising other ingredients.
31. Use of the composition of any one of embodiment 17 to 30 in additive processing.

32. A 3D-printed fluoropolymer, wherein the 3D-printed fluoropolymer has a density of more than 2.00 g/cm³ and/or a void content (Voi) of less than 200%, preferably between 1% and 185%, more preferably less than 20%, most preferably between 1% and 15%, and wherein the fluoropolymer has a melt flow index at 372° C. and 5 kg load (MFI 372/5) of less than 50 g/10 min, preferably less than 1 g/10 min, more preferably less than 0.1 g/10 min.
33. The 3D-printed fluoropolymer embodiment 32 wherein the 3D-printed fluoropolymer has a degree of orientation in at least one plane orientation as measured by polarized light microscopy of not greater than 20%, preferably not greater than 10%.
34. The 3D-printed fluoropolymer of any one of embodiment 32 or 33 wherein the 3D-printed fluoropolymer has an anisotropy in an x-y plane of less than 50%, preferably less than 20% as determined by the ratio of the SVI indices in the x and y direction of that plane.
35. The 3D-printed fluoropolymer of any one of embodiment 32 to 34 wherein the 3D-printed fluoropolymer has elongation at break of at least 100% and or a tensile strength of at least 5 MPa.
36. The 3D-printed fluoropolymer of any one of embodiment 32 to 35 wherein the fluoropolymer is selected from the group consisting of tetrafluoroethene homopolymers, tetrafluoroethene copolymers containing up to 1% by weight of perfluorinated alpha-olefin comonomers, and tetrafluoroethene copolymers containing more than 1% by weight and up to 30% by weight based on the weight of the polymer of perfluorinated comonomers, partially fluorinated comonomers and non-fluorinated comonomers.
37. The 3D-printed fluoropolymer any one of embodiment 32 to 36 being obtainable by the method of any one of embodiments 1 to 16.
38. An article comprising the 3D-printed fluoropolymer of any one of embodiment 32 to 37.
30. The article of embodiment 38 being an integral article.
40. The article of any one of embodiments 38 or 39 selected from the group consisting of bearings, gaskets, seals, valves, valve seats, connectors, lids, containers; medical implants, chemical reactors, screws, cogwheels, joints, bolts, pumps, electrodes, heat exchangers, mixers, turbines, electrical transformers, electrical insulators and extruders or components.
41. The article of any one of embodiments 38 to 40 wherein the fluoropolymer is shaped to contain one or more channels, one or more undercuts, one or more than one perforations, and combinations thereof.
42. The article of any one of embodiments 38 to 41 being an integral article and wherein the shaped fluoropolymer comprises one or more structures selected from honeycomb structures and essentially hollow structure.
43. The article of any one of embodiments 38 to 42 being obtainable by the method of any one of embodiments 1 to 16.

The disclosure will now be further illustrated by examples and test method without intending the disclosure to be limited to the tests and examples below.

Test Procedures

Melt Flow Index (MFI)

Melt flow index can be measured with a melt indexer (from Göttfert, Werkstoffprüfmaschinen GmbH, Germany) according to DIN EN ISO 1133 using a 5 kg load and a temperature of 372° C. (MFI 372/5).

Average Particle Size

Average particle size of polymer particles in a dispersion can be measured by electronic light scattering using a Malvern Autosizer 2c in accordance with ISO 13321. This method assumes a spherical partical size. The average particle sizes are measured as the Z-average:

$$D_z = \frac{\sum S_i}{\sum \frac{S_i}{D_i}}$$

Wherein $S_i$ is the scattered intensity of particle i and $D_i$ is the diameter of particle i. This equation typically corresponds to the equation:

$$Dz = \frac{\sum D_i^6}{\sum D_i^5}$$

in the diameter range of the particles used herein. The average particle size of the population is expressed as $D_{50}$ value (median).

Solid Content

The solid content (fluoropolymer content) of the dispersions can be determined gravimetrically according to ISO 12086. A correction for non-volatile inorganic salts was not carried out.

Melting Point

Melting points can be determined by DSC (a Perkin Elmer differential scanning calorimeter Pyris 1) according to ASTM D 4591.5 mg samples are heated at a controlled rate of 10° C./min to a temperature of 380° C. by which the first melting temperature is recorded. The samples are then cooled at a rate of 10° C./min to a temperature of 300° C. and then reheated at 10° C./min to a temperature at 380° C. The melting point observed at the second heating period is referred to herein as the melting point of the polymer (melting point of the once molten material).

Density of Fluoropolymers

For fluoropolymer used as raw materials (i.e. unsintered fluoropolymers, the SSG density was determined following the procedure of ASTM D4895-15, and method A of D4895-15).

For shaped fluoropolymer and fluoropolymer articles the standard specific gravity (SSG) was measured following ASTM D4895-15 but not following the sintering procedure. Therefore, only the density termination according to ASTM D792-13 to which ASTM D4895-15 refer was used and the SSG density corresponds to the density of ASTM D792-13 (also referred to herein as "density" or "gravimetrical density"). ASTM D792-13 method A was used but using n-butyl acetate instead of water (and accordingly for the calculation the density of n-butyl acetate at 23° C. was used instead of the density of water at 23° C.). The method was applied to shaped (and sintered) fluoropolymers. Samples were taken as obtained, or samples were cut out from an article.

Elongation at Break and Tensile Strength at Break

Elongation at break and tensile strength at break can be determined according to DIN EN ISO 527-1 using a Zwick Tensile Tester. Test specimen are elongated at a speed of 50 mm/min at room temperature (22° C.+/−3° C.).

Samples may be used as cut out. For articles that are of smaller size than required by the norm, smaller test specimen can be used. The specimen have the same shape but reduced dimensions. The length may be a minimum of 0.5 mm and minimum thickness of 0.125 mm.

Void Content

The void content (Voi) indicates the volume taken up by voids in a test sample and is therefore an indication of how well the fluoropolymer particles have coalesced. The lower the void content the better the coalescence. The void content is expressed in %. It can be calculated according to the equation:

$$Voi(\%) = 1000 \times (1 - d_g/d_{IR}),$$

wherein $d_g$ is the gravimetrical density of the sample and $d_{IR}$ is the infrared density of the sample. The gravimetrical density can be determined by displacement as described in ASTM D792-13, (referred to in ASTM D792-13 as "density"). Preferably method A of ASTM D792-13 is followed using n-butyl acetate (and the density of n-butyl acetate) as liquid medium in method A. Although ASTM D792-13 requires a sample weight of 1 to 50 g also samples with a smaller weight, can be used measured according to this method. The infrared density ($D_{IR}$) can be determined following a method described in U.S. Pat. No. 3,855,191 to Doughty et al, incorporated herein by reference. Although, the method is described in U.S. Pat. No. 3,855,191 to measure coagulated fluoropolymer powders it can be used in modified form for shaped article. Accordingly, a test specimen can be prepared by cutting a test probe having a thickness of about 0.5 mm thickness (0.43 to 0.89 mm), for example using a microtome as known in the art. To determine the $d_{IR}$ the test specimen can be examined by IR spectrometry measuring the absorbance at 778 cm$^{-1}$ and 2353 cm$^{-1}$. The percentage (by weight) of amorphous content is then calculated according to the equation:

$$\text{Wt \% (amorphous)} = 30.26 \times A_{778}/A_{2353} + 1.73 \times (A_{778}/A_{2353})^2.$$

A straight line is drawn of density (g/cm$^3$) over amorphous content (wt %) using the following end points: a density of 1.966 g/cm$^3$ for 100 wt % amorphous content and a density of 2.340 g/cm$^3$ for 0% amorphous content (100% crystallinity). The infrared density of the sample can then be determined by finding the corresponding density for the given value of Wt % (amorphous), either graphically by locating the Y-value in the straight line or by calculating it using the slope of the straight line.

The same test specimen is then measured to determine its gravimetric specific density (dg) (according to ASTM D792-13, method A) in butyl acetate and the void content is then calculated.

Stretch Void Index (SVI)

This method compares the specific density of a fluoropolymer sample under force. The method is described in EN ISO 12086-2006 (D). The SVI is calculated by the difference of the specific density of sample in unstretched form and stretched from multiplied by one thousand. A test sample is prepared from the article. The sample can have the dog-bone shape and dimensions as described in EN ISO 12086-2-2006 (D). The dog-bone test strip according to the norm has a minimum length of 38 mm. For smaller samples, i.e. from articles having a length of less than 1 cm, samples of the same shape but of a minimum length of 10 mm or 5 mm or 0.5 mm can be prepared and the width is then adjusted accordingly to give a dog-bone shape. The thickness of the sample can be between 0.125 and 1.5 mm as described in the norm. The sample is used as is, sintering as described in the norm is not carried out.

The density of the test sample is determined in butyl acetate as described above.

The test sample is then stretched (elongated) in a tensile tester by 50%, 100%, preferably 200% at a speed of 5 mm+/−1 mm/min. Then the density of the stretched sample is determined as described above and the SVI is calculated. $SVI = (d_g - d_{g(stretched)}) \times 1000$.

While the SVI values differ depending on the elongation (stretching) of the sample, the ratio of SVIy/SVIx of the samples remained constant over the degree of stretching (stretching between 50% and 440% at speed of 5.0 mm/min) and was thus independent from the degree of stretching. SVIy is the SVI measured from samples cut in the y-direction, i.e. across the extrusion direction. SVIx is the SVI determined from samples cut in the x-direction, i.e. along the extrusion direction. The SVIy and SVIx samples were taken from the same product sample—just cut in X or Y direction of the sample, i.e. orthogonal to each other). The ratio of SVIy/SVIx ratio for an ideal isotropic material would be 1.00. The deviation from this value corresponds to the % of anisotropy of the sample. For example, a SVY/SVIx ratio of 1.12 corresponds to an anisotropy of 12%.

Degree of Orientation (Polarized Light Microscopy)

Test samples were analyzed for the degree of oriented structure present in the samples by means of polarized light microscopy. Herein, the light transmission of the sample being placed at different angles to the polarization plane of the incident light was quantified. For this purpose, a Universal Axioplan microscope (from Carl Zeiss Microscopy GmbH, Oberkochen, Germany) was used in transmitted light mode (2.5 magnification), the instrument was further equipped with a polarization filter and a with lambda plate (serial part #453656 from Carl Zeiss Microscopy GmbH). Color images were taken by a digital camera (Sony MC3250P 3CCD Color Video Cam) and an image software (AxioVs40 from Carl Zeiss Vision) was utilized. Test samples had thicknesses of from 50 µm to 1,600 µm. Results appeared to be independent of the sample thickness as long as the sample was still translucent enough to allow transmission of light for taking measurements. The fixed samples were rotated clockwise by rotating the sample plate in z-direction by an angular step of 10° such that the sample was placed at different angles with respect to the polarized light and images were taken at each 10° step until a full revolution was completed (sample rotation by 360°).

The degree of transmission was indicated by the brightness of the microscope images recorded at different angles to the polarization plane of the incident light. To quantify the brightness, the colored images were analyzed for the RGB (red, green, blue) value (RGB standard) of each picture. In the RGB standard each of the primary color red, blue and green is given by a value in between 0 and 255; wherein 0 indicates the least intensity and 255 the highest intensity. For example, the RGB of 0/0/0 represents the color black and the RGB of 255/255/255 represents the brightest white. The colored images were analyzed for the RGB codes using the image processing software provided by the instrument supplier (AxioVs40 from Carl Zeiss Vision). Alternatively, any other commercial graphic processing software can be used (e.g. Corel Photo-Paint X5 from Corel Corporation; Ottawa, Canada). The RGB values for each image were added up to give a single number. For example if the RGB value for an image obtained at a specific angle is (50/100/255), the added RGB value is 405 (50+100+255). This procedure was conducted for all images taken at angles between 0 and 360° of sample rotation in the z-plane.

In case of samples being highly orientated, discernible differences in the brightness of the transmitted polarized light (sum of the RGB values) are observed in the microscope pictures recorded at different angles. The highest added RGB value (vB) and the lowest added RGB value (vL) were determined, and the ratio of vB/vL was calculated. The brightness contrast between the images was monitored by a change in the added RGB values between the various images, and a high brightness contrast is indicative for an orientation within the sample. The degree of orientation was quantified by the brightness contrast given by the ratio of vB/vL. A value of vB/vL=1.10 represents an anistropy of 10% or a degree of oriented material in the sample of 10%. On the other hand, a brightness contrast being close to vB/vL=1.00 is indicative for the absence of optical anisotropy within the sample. For such a material with no orientation, the degree of oriented materials is 0.

EXAMPLES

Example 1

A fluoropolymer article was produced by stereolithography (vat polymerization) using a PICO 2 "3D printer" (energy source: 385 nm LED) from ASIGA Anaheim Hills, Calif., USA. The default settings were used except for the following settings: Slice thickness=50 µm, Burn-In Layers=2, Separation Velocity=5 mm/s, Slides per Layer=2, Burn-In Exposure Time=20.0 s, Normal Exposure Time=8.000 s.

The article shown in FIG. 1 was created in an electronic file in a format readable by the 3D printer. The device is shown in FIG. 1.

A fluoropolymer dispersion was prepared as follows: 10 g deionized water was added to 40 g PTFE dispersion (PTFE with a comonomer content of 0.03% wt HFP), solid content 58% wt, average particle size; 190 nm, fluorinated emulsifier below 50 ppm, 6% based on PTFE content of non-ionic aliphatic stabilizing emulsifier) followed by adding under gentle stirring 7 g acrylic resin as binder (SARTOMER SR 415, from Sartomer Americas, Exton, Pa., USA) and 0.58 g of photoinitiator (IRGACURE 819DW, available from BASF, Charlotte, N.C., USA), 0.075 g of inhibitor (2,6-Di-tert-butyl-4-methylphenol, (BHT) product #34750, available front Sigma-Aldrich, St Louis, Mo., USA). The dispersion was placed in the polymerization vat and subjected to 3D printing m the 3D printer.

Figure 3A:
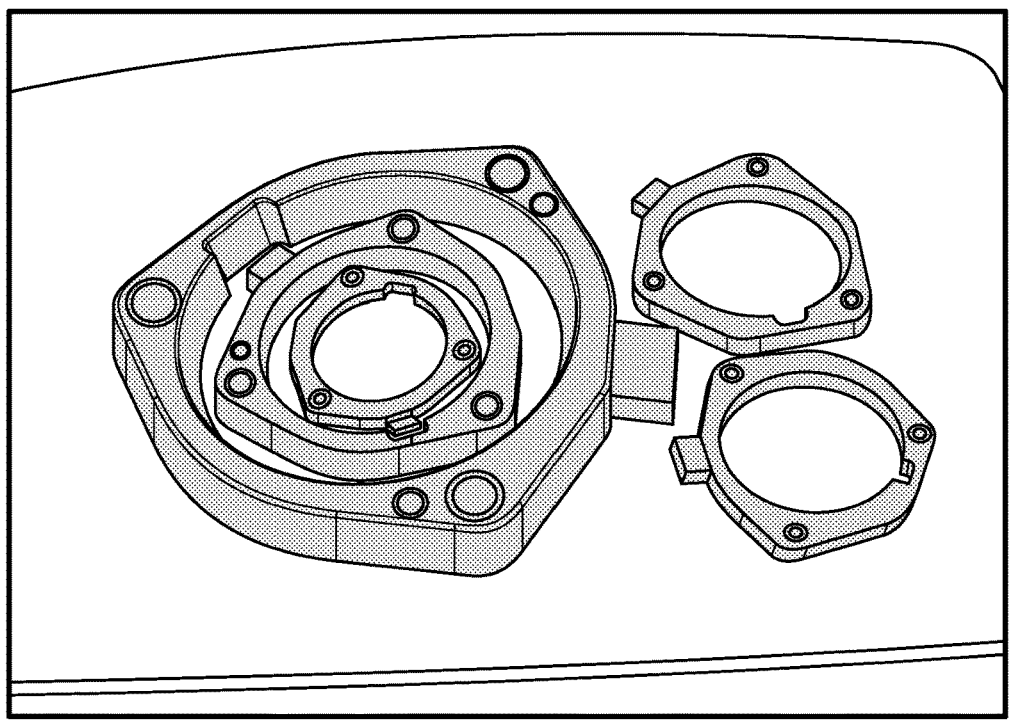
FIG. 3A to 3D are photographs of fluoropolymer articles at various stages of their production.

After completion of this processing step the article was rinsed with deionized water. The resulting article shown in FIG. 3A was obtained. This "green body" was then subjected to drying at room temperature for 24 hours.

Figure 2:
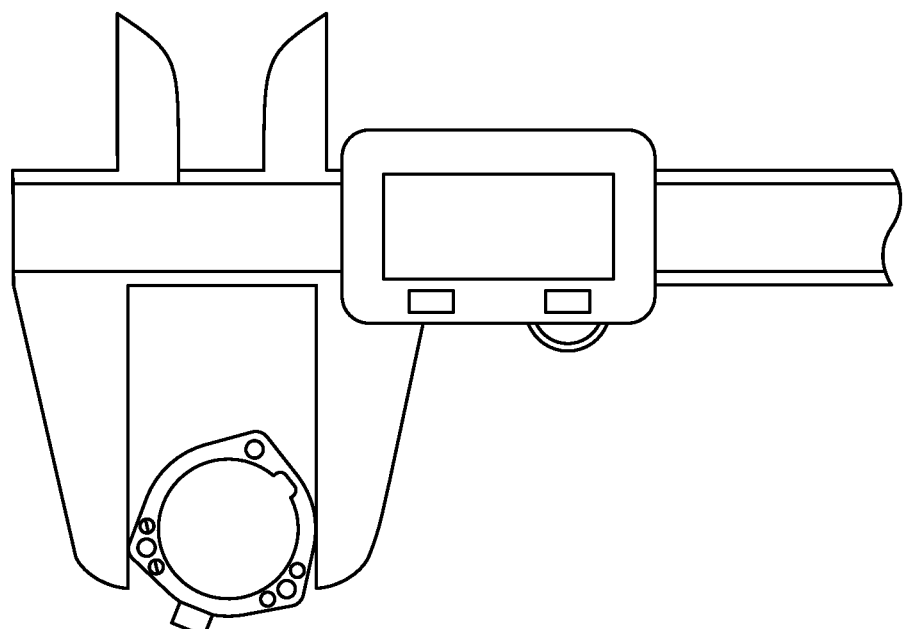
FIG. 2 is an illustrative drawing showing the determination of the diameter of the articles produced because the articles produced were not symmetric.
Figure 3B:
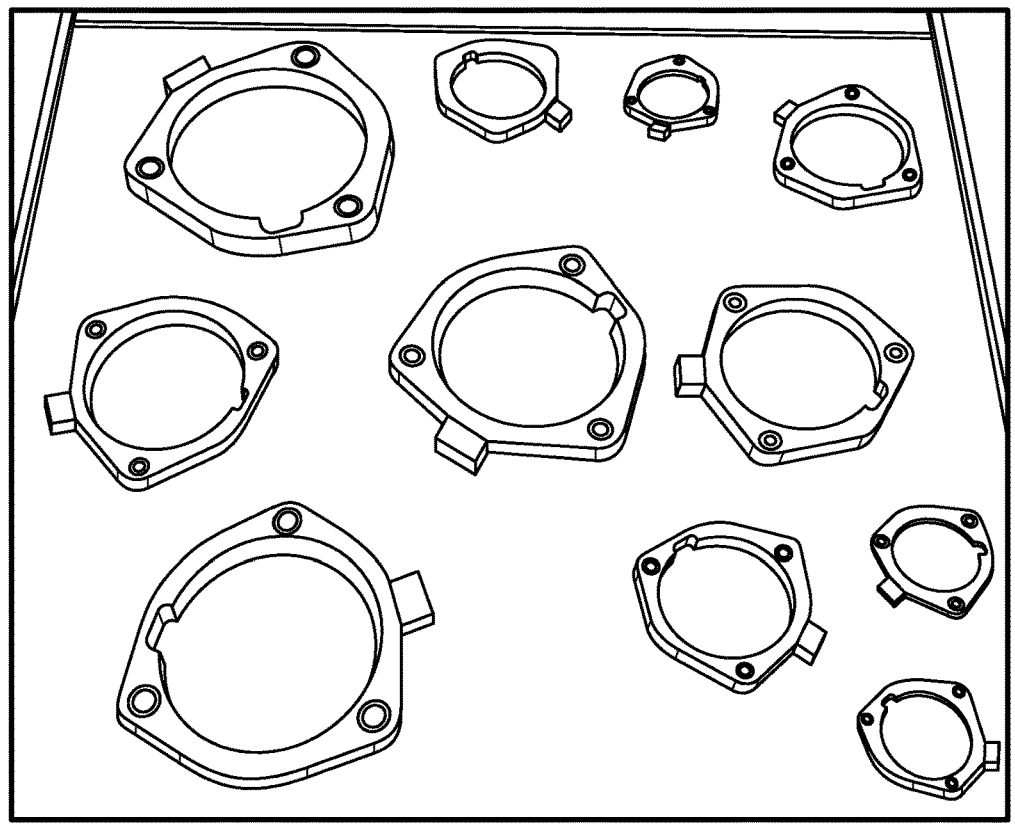
Figure 3C:
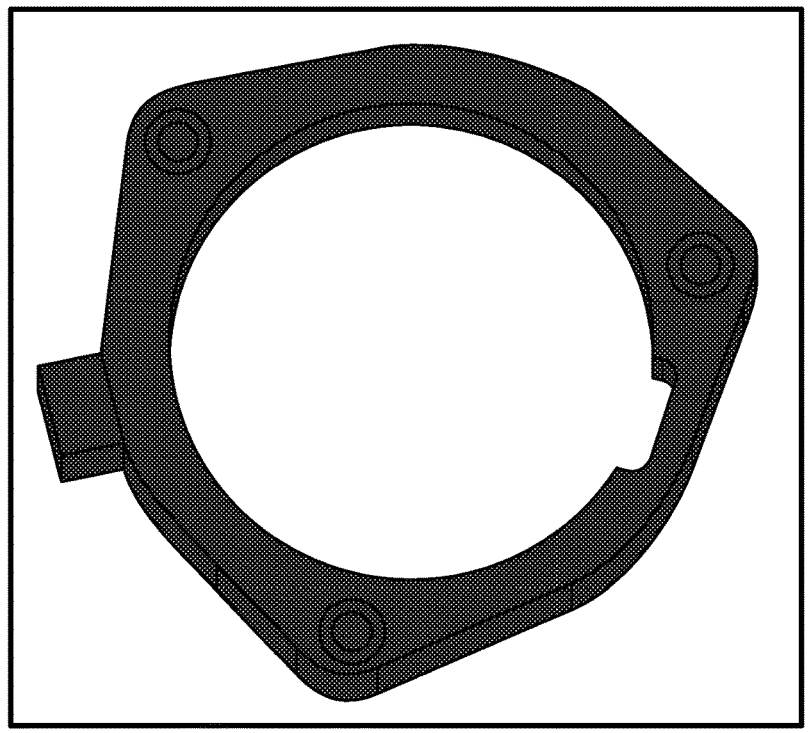
Figure 3D:
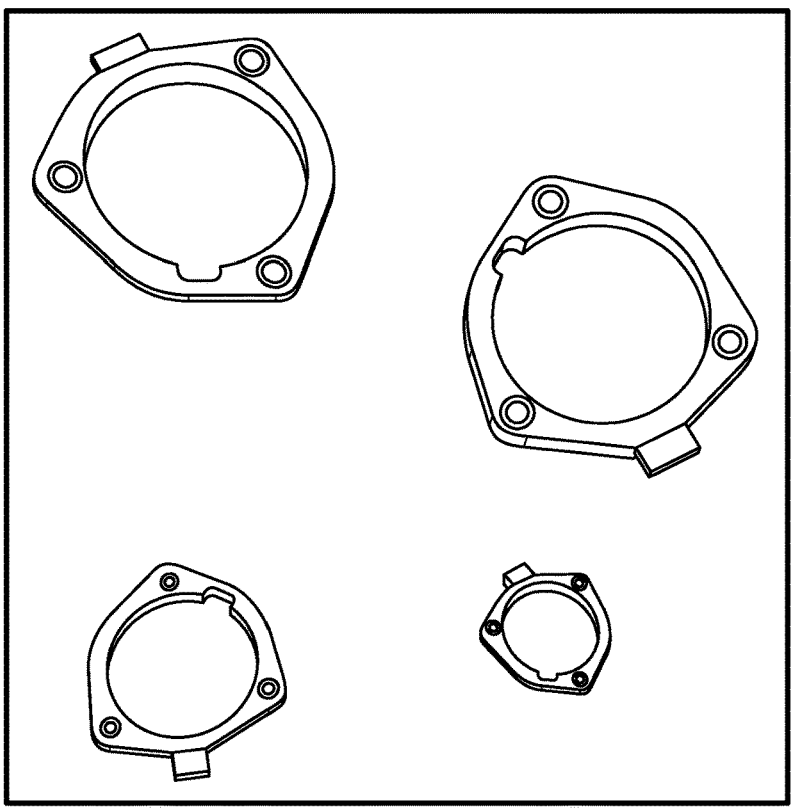

The dried article (shown in FIG. 3B) was then subjected to heating to remove the binder resin. The heating was carried out in an oven using the following sequence: ramp from room temperature to 320° C. for 6 hours; ramp to 330° C. for 6 hours, hold at 330° C. for 36 hours, ramp to 340° C. for 8 hours, ramp to 370< C. for 8 hours, hold at 370° C. for 4 hours, allow to reach room temperature. Early in the heating process the article turned black as shown in figure (FIG. 3C). At the end of the entire heating cycle the resulting article was white again (FIG. 3D). There was only little shrinking and when inspected by the naked eye the final article was not porous. It had a density of 2.15 g/cm³ which is comparable to that of fluoropolymer articles obtained by conventional subtractive shaping techniques. This shows voids that may have been created by burning off the binder were filled by fused polymer particles formed during the heating. Articles of the same shape but of different sized were produced by the methods described herein as shown in FIG. 3D. Their size ("diameter") can be determined using a caliper as shown in FIG. 2. The smallest article obtained had a "diameter" as measured by the caliper of about 7.7 mm.

Examples 2a-2d

The polymer composition of example 1 was compared with a polymer composition having a higher comonomer content. Various 3D-printable compositions 2a-2d of the following compositions were prepared with the ingredients as shown in table 1 in the same way as described in example 1:

TABLE 1

| 2a | 2b | 2c | 2d |
|---|---|---|---|
| SR415 (7 g) | SR415 (10g) | SR415 (7g) | SR415 (10 g) |
| SR344 (7 g) | SR344 (10 g) | SR344 (7 g) | SR344 (10 g) |
| DI water (20 g) | DI water (14 g) | DI water (20 g) | DI water (14 g) |
| Fluoropolymer dispersion 1 (80 g) | Fluoropolymer dispersion 1 (80 g) | Fluoropolymer dispersion 2 (80 g) | Fluoropolymer dispersion 2 (80 g) |
| Igracure 819DW (0.288 g) | Igracure 819DW (0.288 g) | Igracure 819DW (0.288 g) | Igracure 819DW (0.288 g) |
| BHT (0.1152 g) | BHT (0.1152 g) | BHT (0.1152 g) | BHT (0.1152 g) |
| Ob-M1 (0.0576 g) | Ob-M1 (0.0576 g) | Ob-M1 (0.0115 g) | Ob-M1 (0.0115 g) |

Fluoropolymer dispersion 2 was the dispersion used in example 1. Fluoropolymer dispersion 1 contained a modified PTFE (PPVE as comonomer (0.07% by weight based on weight of polymer), MFI (372/5) of <0.1 g/10 minutes, particle size 190 nm ($D_{50}$), fluorinated emulsifier below content 50 ppm, 6% wt. based on PTFE content of non-ionic, aliphatic stabilizing emulsifier. The 3D-printable compositions were subjected to 3D-printing as described in example 1.

Cylinders were printed to have final dimensions of 3 mm thickness and 8 mm diameter, so the CAD model was sealed by 1.47 to account for the 32% isotropic shrinkage throughout drying and sintering.

The sintering conditions were as follows:

12 hour ramp to 350° C., 72 hours hold at 350° C., 12 hour ramp to 400° C., 24 hours hold at 400° C., cool to room temp (no active cooling).

The article prepared from composition 2a showed no surface defects that were visible to the naked eye. The article printed from composition 2b showed some surface defects and showed bumps believed to be due to trapped combustion gases.

The article prepared from composition 2c and 2d also showed some surface defects and differed from fluoropolymer composition 1 by its comonomer content. It is believed that the higher comonomer content of fluoropolymer composition 1 allows better and more compact fusion of the polymer particles. Voids generated by combusted binder material may be easier filled by fused particles which overall leads to less or more controlled shrinkage.

To determine the structural accuracy of the 3D-printing method the same article (a cylinder with a targeted diameter of 8.0 mm and a thickness of 3.0 mm was prepared a) from a sintered PTFE block by machining, and b) by 3D-printing with composition 2a).

Table 2 shows a comparison of the dimensions of the cylinders obtained (4 cylinders were produced by both methods). Table 2 shows the dimensional accuracy of the 3D-printing method.

TABLE 2

| Machined | | Printed | |
| --- | --- | --- | --- |
| Diameter (mm) | Thickness (mm) | Diameter (mm) | Thickness (mm) |
| 7.99 | 3.01 | 7.99 | 3.06 |
| 8.04 | 3.06 | 8.07 | 2.96 |
| 8.01 | 3.03 | 8.00 | 3.03 |
| 8.02 | 3.03 | 7.94 | 3.01 |

Example 3: Physical Properties of 3D Printed Articles Versus Non 3D-Printed Articles Example 3A: Extruded Material A PTFE composition (PTFE composition 2 of example 2), primary particle size 190 nm ($D_{50}$) was coagulated and agglomerated to give a line powder that is suitable for paste extrusion. The obtained fine powder had a particle size (secondary particles) of 180 μm ($D_{50}$). The fine powder was mixed with 18.7 wt % ShellSol T from Shell Chemicals, which serves as lubricant for extrusion. Mixing was carried out for 30 min with a tumbling mixer. The mixture was then aged in an oven at 30° C. for 15 h. A cylindrical preform was pressed with a hydraulic press and subsequently extruded in a paste extruder. Paste extrusion of a rod was carried out with a paste extruder made by Keicher Engineering AG, Ulm, using a die with a smallest diameter of 11.2 mm. The reduction ratio, i.e. the ratio of the cross sectional area of the extrusion cylinder and the cross sectional area of the extrusion die was 32.

The extruded rod was subsequently calendered to various sheets of different thickness: 50 μm, 100 μm, 300 μm and 1600 μm by calendering with a two-roll calender.

The extruded sheets were dried to remove the lubricant at 150° C. for 12 h and subsequently sintered with the following sintering procedure: initial temperature: RT, rate of heating: 60° C./h to 100° C. hold temperature: 100° C., hold time: 48 h, rate of heating: 120° C./h to 260° C., hold temperature: 260° C., hold time: 24 h, heating rate: 120° C./h to 380° C., hold time: 26 h, cooling rate: 60° C./h.

To determine the SVI tensile specimens were cut from sheet samples having a thickness of 300 μm and 1600 μm produced by the method above using a microtensile die described in EN ISO 12086-2 and the ratio of SVIy/SVIx was determined. Test specimens were strained at constant rate of 5.0 mm/min until an elongation at break of 440% or until the sample breaks if earlier. Minimum elongation was about 50%. The ratio of SVIy/SVIx was found to be 1.6. Therefore, the stretching void index was direction-dependent and thus the anisotropy of the material was 60%. Unlike the SVI the ratio of SVIy/SVIx was found to be independent of the thickness of the samples.

The anisotropy of the extruded and calendared sheet were determined by polarized microscopy was 48% (the ratio of the maximum and minimum added RGB values was 1.48). The result was the same independent of the thickness of the samples. Sample sheets with thicknesses of 50, 100 and 300 μm were used.

Example 3B (3D-Printed Sheets)

The dispersion of fluoropolymer composition 2 was used to prepare a sheet by 3D-printing analogue to the procedure described in example 1. The fluoropolymer article was produced by stereolithography (vat polymerization) using a S30 "3D printer" (energy source: 405 nm LED) from Rapid Shape GmbH, Germany.

The printed sheet was heat-treated with the following procedure: initial temperature: RT, rate of heating: 60° C./h to 100° C., hold temperature: 100° C., hold time: 48 h, rate of heating: 120° C./h to 260° C., hold temperature: 260° C. hold time: 24 h, heating rate: 120° C./h to 380° C., hold time: 26 h, cooling rate: 60° C./h. Sample thickness after heat-treatment was about 1 mm. The material had a density of 2.170 g/cm$^3$ and a void index of 6 o/oo.

Characterization of the material by stretching void index (SVI) measurements carried out as described in example 3A gave a ratio of SVIy/SVIx of 1.2 corresponding to an anisotropy of 20%. No differences in colors of the polarized light microscope pictures could be observed for the printed sheet. Thus, the anisotropy is negligible. Quantitative measurement by polarized light microspcopy gave a ratio of the maximum and minimum added RGB values of 1.03, corresponding to an anisotropy of 3%.

Example 3C (Coagulated and Sintered PTFE)

500 ml of fluoropolymer dispersion 2 (but with solid content of 20% and without stabilizing non-ionic emulsifier) was coagulated at room temperature with a 10 wt % oxalic acid solution (10 g). The latex coagulated as extremely fine particles; the particles settled slowly at the bottom of a flask. The water was carefully decanted. The polymer layer was put into ALLUMINOX pans (Ø7 cm) and were dried and sintered as described in example 3A. From pieces of the sintered material the density was measured as 2,005 g/cm$^3$; the resulting void content by measuring the amorphous content was: 76 (o/oo). Example 3C shows that the same material processed by the same sintering conditions had a lower density and a higher void content than a material that was 3D printed according to a method according to the present disclosure.

Example 4: Paste Extrusion

In this example a PTFE paste was extruded via a syringe extruder 3D printer to form a part. The paste was formulated from the following composition:

TABLE 3

| Material | Weight (g) | Weight % |
|---|---|---|
| PTFE dispersion 2 of example 2 | 20 | 69.4% |
| MEK | 5.25 | 18.2% |
| SR 415 | 1.75 | 6.1% |
| SR 344 | 1.75 | 6.1% |
| Irgacure 819DW | 0.050 | 0.2% |

MEK (methyl ethyl ketone) and acrylates were mixed to form a clear solution and were then transferred to the PTFE dispersion containing the photoinitiator. The mixture became paste upon mixing.

The paste was printed on a HyRel 3D's System 30M using the VCD-25 extruder head meant for pastes (Hyrel 3D, Norcross, Ga., 30071). The paste was carefully loaded into the syringe and some material was manually extruded to ensure majority of the entrapped air is removed. A 2 mm nozzle was used and UV LED's attached to the base of the extruder emit light at a wavelength of 365 nm. In addition to the mounted LED's, a UV LED strip containing 50+4 mW 365 nm LED's was also used in order to increase the light intensity on the printed article.

Simple prisms were made for this example. Settings on the printer were adjusted to achieve the appropriate layer thickness, line spacing, and structure fidelity. For example, the adjustments from the standard settings for a typical print could be: layer height=0.5 mm, Random seam position, 100% rectilinear fill, 10 mm/s move speed, 2.5 mm extrusion width, and an extrusion multiplier of 3.5.

The invention claimed is:

1. A method of producing a fluoropolymer article by additive processing in an additive processing device containing at least one energy source, the method comprising
   (i) depositing a composition comprising fluoropolymer particles and a polymerizable binder to create a layer of the composition;
   (ii) exposing areas of the composition in the layer to the energy source to polymerize and solidify the binder and bind the fluoropolymer particles in the areas exposed to the energy source; and
   (iii) repeating steps (i) and (ii) to form successive layers of the fluoropolymer article; wherein the fluoropolymer is selected from the group consisting of
   (a) polytetrafluoroethylene, consisting of tetrafluoroethylene homopolymers and tetrafluoroethylene copolymers containing up to 1% by weight of perfluorinated alpha-olefin comonomers; and
   (b) tetrafluoroethylene copolymers containing more than 1% by weight and up to 30% by weight based on the weight of the polymer of perfluorinated comonomers, partially fluorinated comonomers and non-fluorinated comonomers.

2. The method of claim 1 wherein the energy source is selected from electromagnetic irradiation.

3. The method of claim 1 wherein the composition comprises fluoropolymer particles having an z-average particle size from about 50 to 500 nm.

4. The method of claim 1 wherein the composition comprises an aqueous dispersion of fluoropolymer particles.

5. The method of claim 1 wherein the fluoropolymer has a melt flow index at 372° C. and 5 kg load of less than 1 g/10 min.

6. The method of claim 1 wherein the fluoropolymer has a melt flow index at 372° C. and 5 kg load of from 1 to 50 g/10 min.

7. The method of claim 1 wherein the fluoropolymer is a tetrafluoroethylene copolymer containing more than 1% by weight and up to 30% by weight based on the weight of the polymer of perfluorinated comonomers, partially fluorinated comonomers and non-fluorinated comonomers and wherein the fluoropolymer has a melting point between 260° C. and 315° C.

8. The method of claim 1 wherein the binder material comprises polymerizable unsaturated bonds.

9. The method of claim 1 wherein the binder material comprises polymerizable groups selected from acrylates and methacrylates.

10. The method of claim 1 further comprising, after step (iii), (iv) at least one heat treatment to remove the binder material.

11. The method of claim 10, further comprising sintering the fluoropolymer particles during the at least one heat treatment to remove the binder material.

12. The method of claim 10, further comprising (v) sintering the fluoropolymer particles after step (iv).

13. The method of claim 1 wherein causing the binder material to polymerize and solidify to bind fluoropolymer particles comprises
   (i) either (a): directing energy from the energy source of the additive manufacturing device to a selected location of the layer of the composition and causing the binder material to polymerize and solidify to bind fluoropolymer particles; or (b): directing a selected location of the composition to the energy source and causing the binder material to polymerize and solidify to bind fluoropolymer particles, or a combination of (a) and (b);
   (ii) either (c) directing the energy source away from the composition or (d) directing the composition away from the energy source, to avoid the binder material polymerizing in the non-selected locations, or a combination of (c) and (d).

* * * * *